United States Patent
Tsuruoka

(10) Patent No.: US 10,129,123 B2
(45) Date of Patent: Nov. 13, 2018

(54) MEASUREMENT APPARATUS, COMMUNICATIONS APPARATUS, AND RELAY APPARATUS

(71) Applicant: FUJITSU LIMITED, Kawasaki-shi, Kanagawa (JP)

(72) Inventor: Tetsumei Tsuruoka, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 15/081,410

(22) Filed: Mar. 25, 2016

(65) Prior Publication Data

US 2016/0212032 A1    Jul. 21, 2016

Related U.S. Application Data

(63) Continuation of application No. PCT/JP2013/076157, filed on Sep. 26, 2013.

(51) Int. Cl.
*H04L 12/26* (2006.01)
*H04L 12/801* (2013.01)
(Continued)

(52) U.S. Cl.
CPC ...... *H04L 43/0876* (2013.01); *H04L 43/0864* (2013.01); *H04L 43/106* (2013.01);
(Continued)

(58) Field of Classification Search
None
See application file for complete search history.

(56) References Cited

U.S. PATENT DOCUMENTS 6,058,102 A * 5/2000 Drysdale ............... H04L 1/24
                                                   370/248
7,248,564 B1 * 7/2007 Grosdidier ......... H04L 43/0864
                                                   370/235
(Continued)

FOREIGN PATENT DOCUMENTS

JP     2003-534715      11/2003
JP     2006-74773        3/2006
(Continued)

OTHER PUBLICATIONS

Xu et al., "Stability and Fairness of Rate Estimation-Based AIAD Congestion Control in TCP", *IEEE Communications Letters*, vol. 9, No. 4, Apr. 2005, pp. 378-380.
(Continued)

Primary Examiner — Andrew Lai
Assistant Examiner — Jamaal R Henson
(74) Attorney, Agent, or Firm — Staas & Halsey LLP

(57) ABSTRACT

A measurement apparatus calculates a rate based on a time base of a second communications apparatus by dividing a total data amount arriving between two arbitrary response messages corresponding to transmission data, by a difference in transmission time information of the response messages. The measurement apparatus calculates a time conversion factor between a first communications apparatus and the second communications apparatus. The measurement apparatus calculates an arrival rate of the transmission data based on a time base of the first communications apparatus, by multiplying the calculated rate by the calculated time conversion factor.

20 Claims, 15 Drawing Sheets

(51) Int. Cl.
*H04L 12/825* (2013.01)
*H04L 12/841* (2013.01)
*H04L 29/06* (2006.01)

(52) U.S. Cl.
CPC ............ *H04L 47/11* (2013.01); *H04L 47/193* (2013.01); *H04L 47/25* (2013.01); *H04L 47/283* (2013.01); *H04L 69/16* (2013.01); *H04L 69/28* (2013.01); *H04L 43/087* (2013.01)

(56) References Cited

U.S. PATENT DOCUMENTS

| | | | |
|---|---|---|---|
| 2006/0045023 A1 | 3/2006 | Kim et al. | |
| 2008/0049633 A1* | 2/2008 | Edwards | H04L 43/0852 370/252 |
| 2008/0219164 A1 | 9/2008 | Shimonishi | |
| 2014/0056234 A1* | 2/2014 | Hedlund | H04W 24/02 370/329 |

FOREIGN PATENT DOCUMENTS

| | | |
|---|---|---|
| JP | 2006-340081 | 12/2006 |
| JP | 2008-199426 | 8/2008 |
| JP | 2008-219605 | 9/2008 |
| JP | 2009-77442 | 4/2009 |
| WO | WO 01/91375 A2 | 11/2001 |

OTHER PUBLICATIONS

Floyd et al., "The NewReno Modification to TCP's Fast Recovery Algorithm", *Internet Engineering Task Force (IETF)*, Nov. 2003.

Brakmo et al., "TCP Vegas : End to End Congestion Avoidance on a Global Internet" *IEEE Journal on Selected Areas in Communications*, vol. 13, No. 8, Oct. 1995, pp. 1465-1480.

International Search Report dated Jan. 7, 2014, in corresponding International Application No. PCT/JP2013/076157.

* cited by examiner

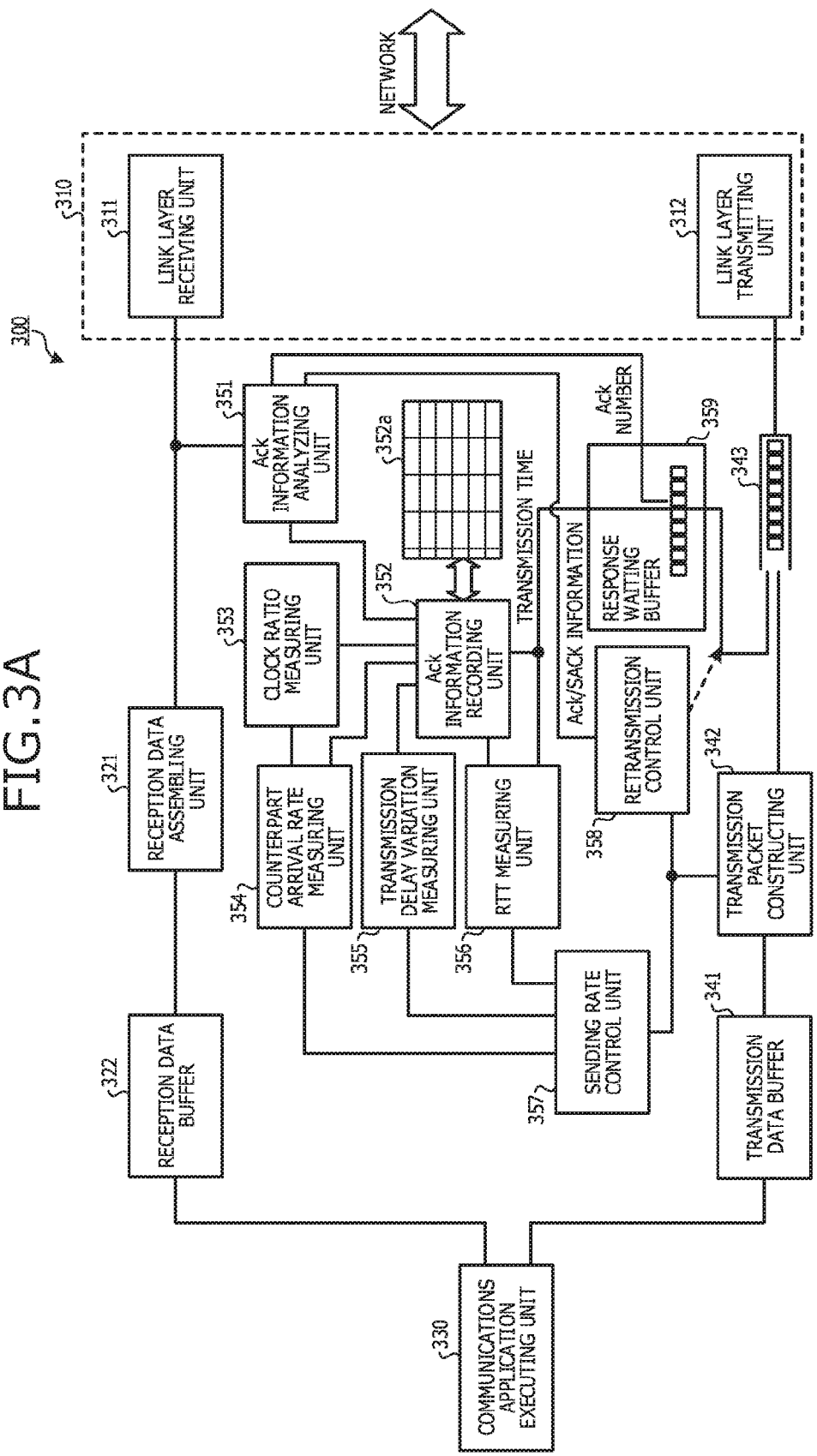

FIG.3C
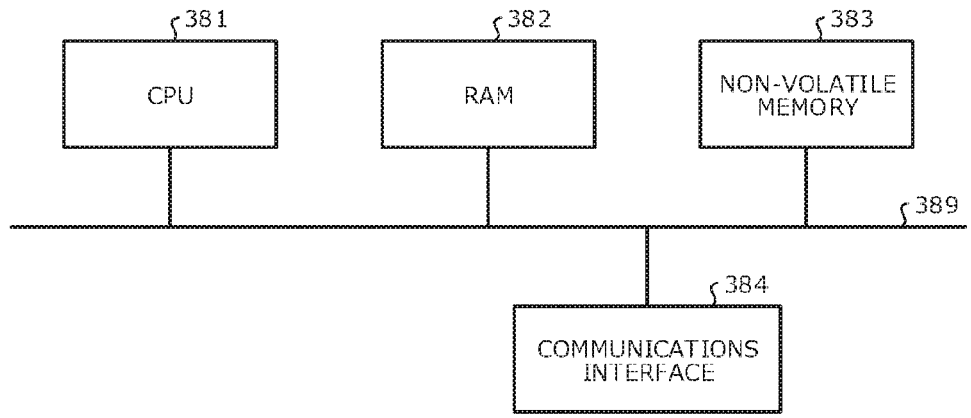
FIG.4A
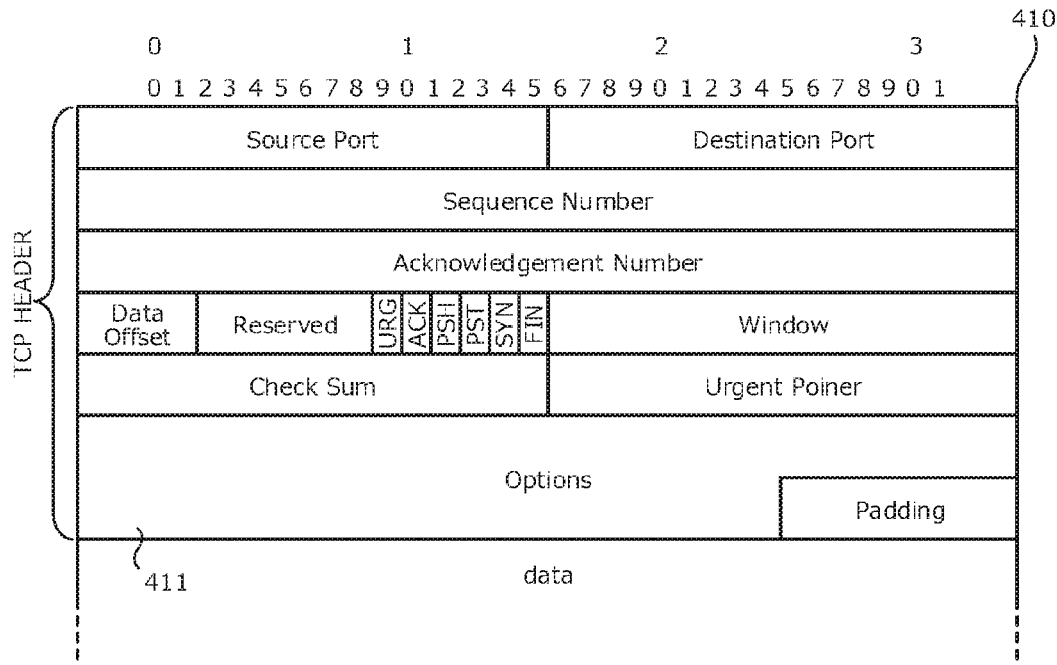
FIG.4B

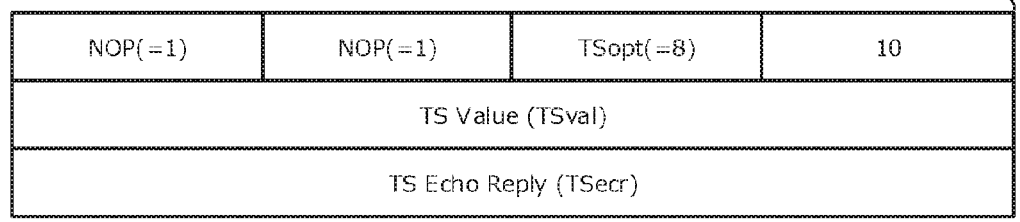
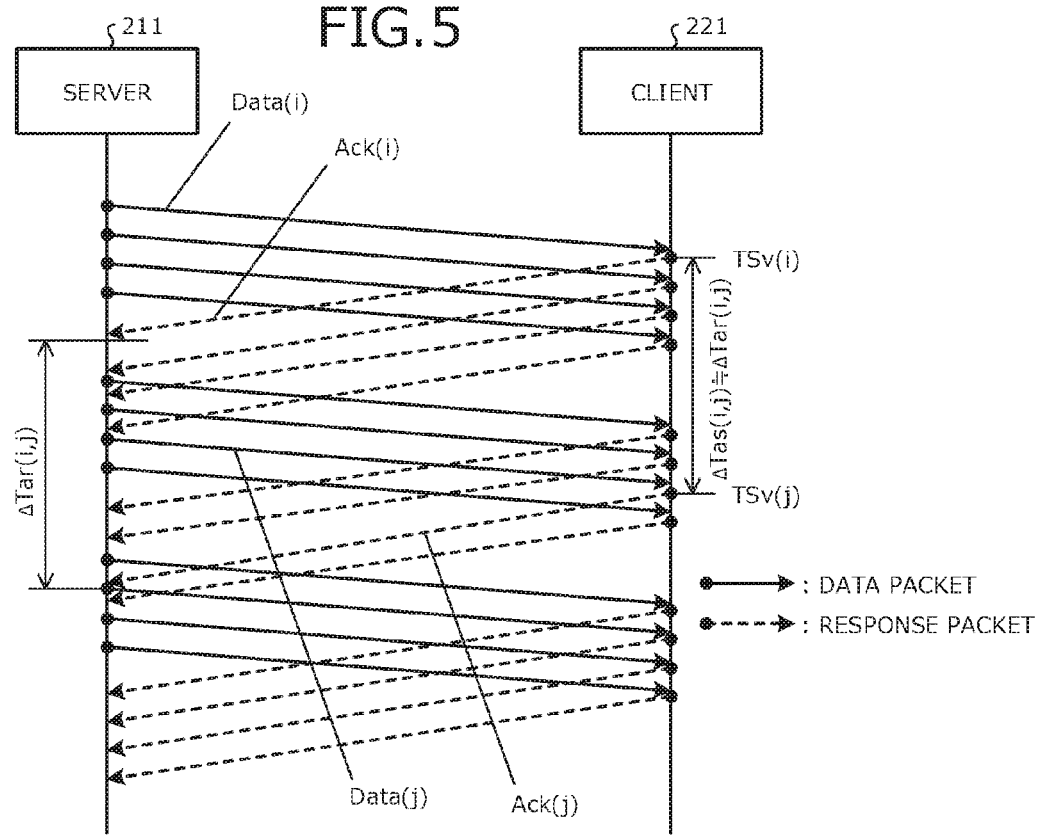

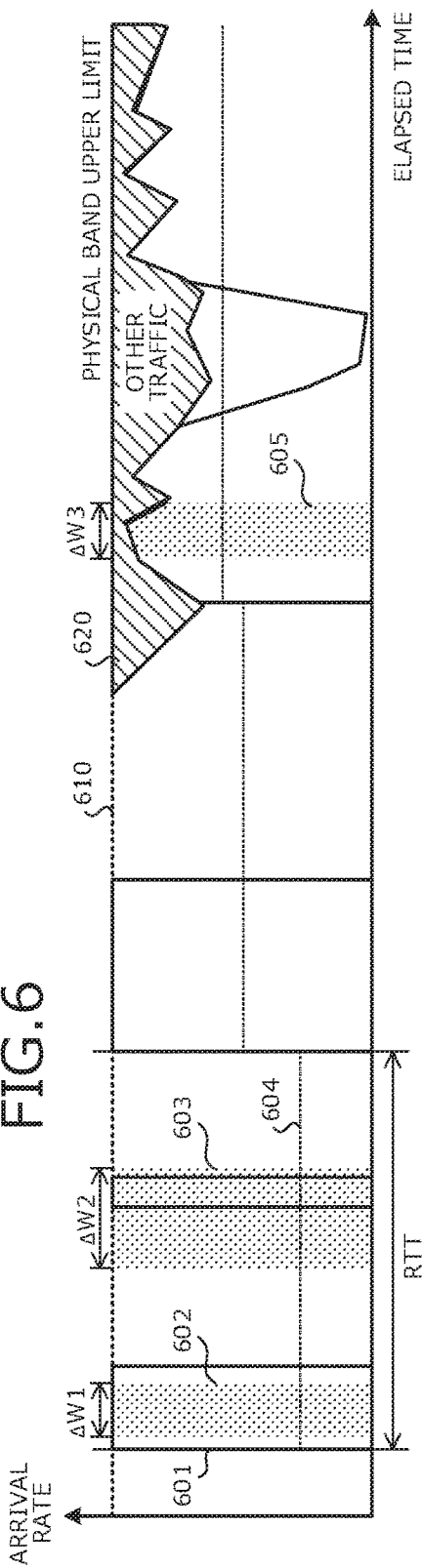

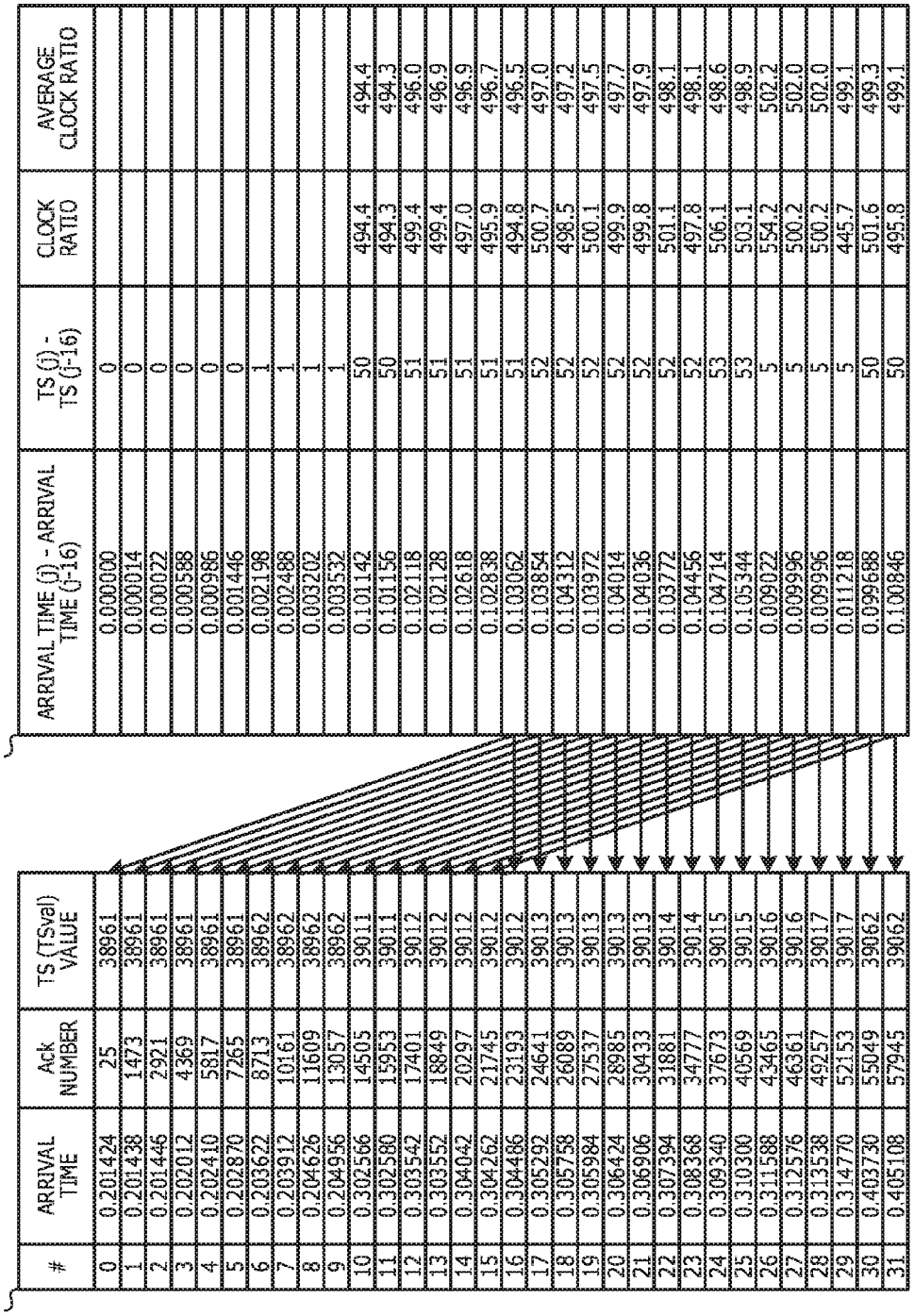

FIG.8

| CLOCK RATIO (×1024) | CLOCK CONVERSION FACTOR | COMMENT |
|---|---|---|
| 1024 | 1024 | SAME AS CLOCK RATIO |
| 4096 | 256 | CLOCK RATIO ×4 |
| 3413 | 307 | CLOCK RATIO ×10/3 |
| 3072 | 341 | CLOCK RATIO ×3 |
| 2560 | 410 | CLOCK RATIO ×2.5 |
| 1229 | 853 | CLOCK RATIO ×1.2 |
| 853 | 1229 | CLOCK RATIO /1.2 |
| 410 | 2560 | CLOCK RATIO /2.5 |
| 341 | 3072 | CLOCK RATIO /3 |
| 307 | 3413 | CLOCK RATIO ×3/10 |
| 256 | 4096 | CLOCK RATIO /4 |
| 102 | 10240 | CLOCK RATIO /10 |

FIG.9

| CLOCK RATIO (×1024) | RANGE (min) | RANGE (max) | CLOCK CONVERSION FACTOR | COMMENT |
|---|---|---|---|---|
| 1024 | 1014 | 1034 | 1024 | SAME AS CLOCK RATIO |
| 4096 | 4055 | 4137 | 256 | CLOCK RATIO ×4 |
| 3413 | 3379 | 3447 | 307 | CLOCK RATIO ×10/3 |
| 3072 | 3041 | 3103 | 341 | CLOCK RATIO ×3 |
| 2560 | 2534 | 2586 | 410 | CLOCK RATIO ×2.5 |
| 1229 | 1217 | 1241 | 853 | CLOCK RATIO ×1.2 |
| 853 | 845 | 862 | 1229 | CLOCK RATIO /1.2 |
| 410 | 406 | 414 | 2560 | CLOCK RATIO /2.5 |
| 341 | 338 | 345 | 3072 | CLOCK RATIO /3 |
| 307 | 304 | 310 | 3413 | CLOCK RATIO ×3/10 |
| 256 | 253 | 259 | 4096 | CLOCK RATIO /4 |
| 102 | 101 | 103 | 10240 | CLOCK RATIO /10 |

FIG.10

| # | TRANSMISSION TIME | ARRIVAL TIME | Ack NUMBER | TIME STAMP |
|---|---|---|---|---|
| 0 | Ts(0) | Tr(0) | A(0) | Tv(0) |
| 1 | Ts(1) | Tr(1) | A(1) | Tv(1) |
| : | | | | |
| i | Ts(i) | Tr(i) | A(i) | Tv(i) |
| : | | | | |
| j | Ts(j) | Tr(j) | A(j) | Tv(j) |
| : | | | | |
| 63 | Ts(63) | Tr(63) | A(63) | Tv(63) |

FIG. 11

| # | ARRIVAL TIME | Ack NUMBER | TS (TSval) VALUE | TS(j)-TS(j-4) | Ack(j)-Ack(j-4) | CONVERSION TIME DIFFERENCE | BYTES/SECOND | TS(j)-TS(j-4) | Ack(j)-Ack(j-4) | CONVERSION TIME DIFFERENCE | BYTES/SECOND |
|---|---|---|---|---|---|---|---|---|---|---|---|
| 0 | 1.479186 | 1762241 | 39600 | ### | ### | | | | | | |
| 1 | 1.485278 | 1779617 | 39603 | ### | ### | | | | | | |
| 2 | 1.490984 | 1796993 | 39606 | ### | ### | | | | | | |
| 3 | 1.496770 | 1814369 | 39608 | ### | ### | | | | | | |
| 4 | 1.502396 | 1831745 | 39611 | 11 | 69504 | 0.022000 | 3159273 | | | | |
| 5 | 1.508238 | 1849121 | 39614 | 11 | 69504 | 0.022000 | 3159273 | | | | |
| 6 | 1.514100 | 1866497 | 39617 | 11 | 69504 | 0.022000 | 3159273 | | | | |
| 7 | 1.520242 | 1883873 | 39620 | 12 | 69504 | 0.024000 | 2896000 | | | | |
| 8 | 1.526834 | 1901249 | 39623 | 12 | 69504 | 0.024000 | 2896000 | 23 | 139008 | 0.046000 | 3021913 |
| 9 | 1.540100 | 1912833 | 39630 | 16 | 63712 | 0.032000 | 1991000 | 27 | 133216 | 0.054000 | 2466963 |
| 10 | 1.546364 | 1924417 | 39633 | 16 | 57920 | 0.032000 | 1810000 | 27 | 127424 | 0.054000 | 2359704 |
| 11 | 1.551904 | 1941793 | 39636 | 16 | 57920 | 0.032000 | 1810000 | 28 | 127424 | 0.056000 | 2275429 |
| 12 | 1.557720 | 1959169 | 39639 | 12 | 63712 | 0.024000 | 2654667 | 28 | 127424 | 0.056000 | 2275429 |
| 13 | 1.563772 | 1976545 | 39642 | 12 | 69504 | 0.024000 | 2896000 | 28 | 127424 | 0.056000 | 2275429 |
| 14 | 1.569404 | 1993921 | 39645 | 12 | 69504 | 0.024000 | 2896000 | 28 | 127424 | 0.056000 | 2275429 |
| 15 | 1.575494 | 2011297 | 39648 | 12 | 69504 | 0.024000 | 2896000 | 28 | 127424 | 0.056000 | 2275429 |
| 16 | 1.581056 | 2028673 | 39651 | 11 | 69504 | 0.022000 | 3159273 | 23 | 133216 | 0.046000 | 2896000 |
| 17 | 1.586888 | 2046049 | 39653 | 12 | 69504 | 0.024000 | 2896000 | 24 | 139008 | 0.048000 | 2896000 |
| 18 | 1.593268 | 2063425 | 39657 | 12 | 69504 | 0.024000 | 2896000 | 23 | 139008 | 0.046000 | 3021913 |
| 19 | 1.598550 | 2080801 | 39659 | 11 | 69504 | 0.022000 | 3159273 | 23 | 139008 | 0.046000 | 3021913 |
| 20 | 1.604376 | 2098177 | 39662 | 12 | 69504 | 0.024000 | 2896000 | 23 | 139008 | 0.046000 | 3021913 |
| 21 | 1.610190 | 2115553 | 39665 | 12 | 69504 | 0.024000 | 2896000 | 23 | 139008 | 0.046000 | 3021913 |
| 22 | 1.616258 | 2132929 | 39668 | 12 | 69504 | 0.024000 | 2896000 | 23 | 139008 | 0.046000 | 3021913 |
| 23 | 1.621858 | 2150305 | 39671 | 15 | 69504 | 0.030000 | 2316800 | 27 | 139008 | 0.054000 | 2574222 |
| 24 | 1.627694 | 2167681 | 39674 | 14 | 60816 | 0.028000 | 2172000 | 25 | 130320 | 0.050000 | 2606400 |
| 25 | 1.634108 | 2185057 | 39680 | 14 | 57920 | 0.028000 | 2068571 | 26 | 127424 | 0.052000 | 2450462 |
| 26 | 1.644108 | 2193745 | 39682 | 14 | 57920 | 0.028000 | 2068571 | 26 | 127424 | 0.052000 | 2450462 |
| 27 | 1.650214 | 2208225 | 39685 | 11 | 57920 | 0.022000 | 2632727 | 26 | 127424 | 0.052000 | 2450462 |
| 28 | 1.655584 | 2225601 | 39688 | 12 | 66608 | 0.024000 | 2775333 | 26 | 127424 | 0.052000 | 2450462 |
| 29 | 1.661144 | 2242977 | 39691 | 12 | 69504 | 0.024000 | 2896000 | 26 | 127424 | 0.052000 | 2450462 |
| 30 | 1.667498 | 2260353 | 39694 | | | | | | | | |
| 31 | 1.673355 | 2277729 | 39697 | | | | | | | | |

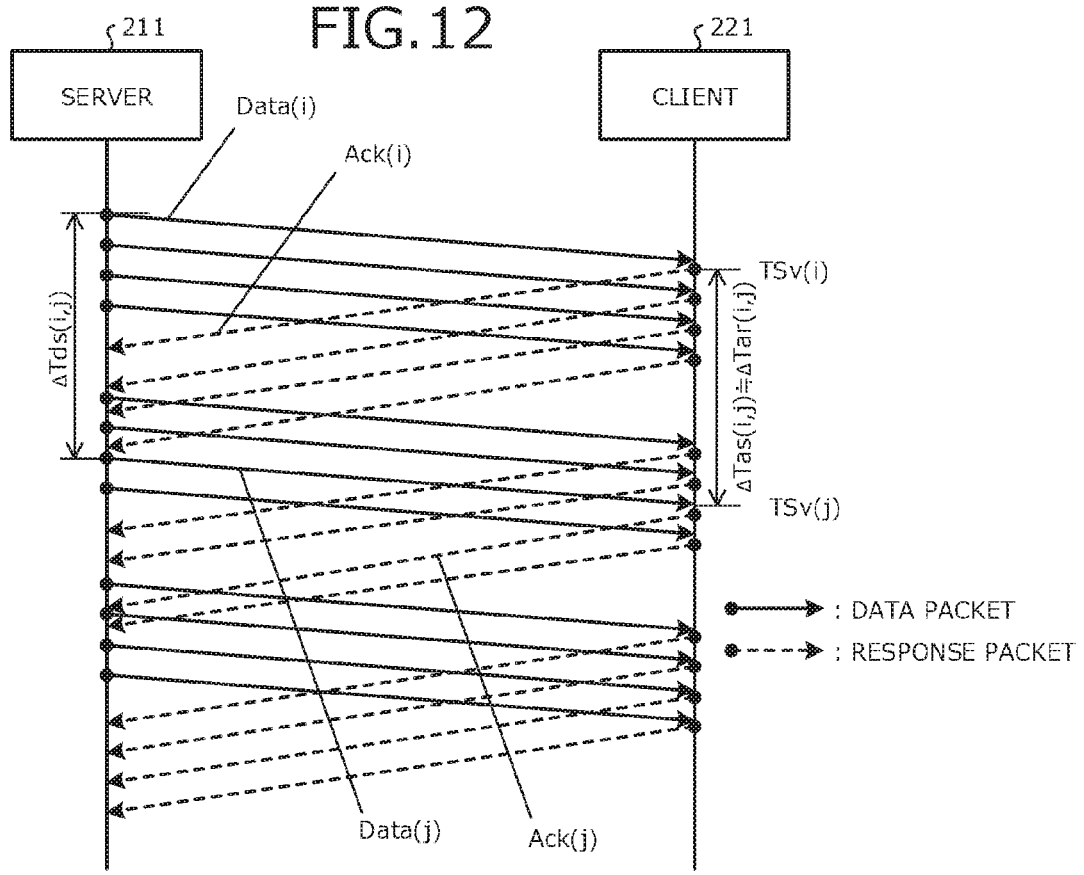

FIG.14

| SOURCE IP ADDRESS | SOURCE TCP PORT | DESTINATION IP ADDRESS | DESTINATION TCP PORT | STATE | START TIME | AGING TIMER |
|---|---|---|---|---|---|---|
| 192.168.1.13 | 31024 | 10.22.33.14 | 1014 | SYN | 10:24:13 | 100 |
| 192.168.1.221 | 11096 | 70.24.33.13 | 4055 | ESTAB | 10:24:13 | 2 |
| 192.168.1.14 | 33413 | 10.22.33.13 | 3379 | IDLE | 10:24:14 | 1 |
| 192.168.1.14 | 33072 | 160.2.1.23 | 3041 | FIN-W | 10:24:15 | 4 |
| 192.168.1.221 | 11097 | 158.80.11.5 | 2534 | ESTAB | 10:24:15 | 5 |
| 192.168.1.13 | 31229 | 170.5.4.4 | 1217 | ESTAB | 10:24:18 | 1 |
| 192.168.1.13 | 31230 | 161.2.33.7 | 845 | ESTAB | 10:24:18 | 3 |
| 192.168.1.13 | 31231 | 12.22.33.2 | 406 | ESTAB | 10:24:18 | 4 |
| 192.168.1.13 | 31232 | 11.22.33.8 | 338 | ESTAB | 10:24:18 | 170 |
| 192.168.1.14 | 33414 | 10.220.33.14 | 304 | FIN | 10:24:19 | 11 |
| 192.168.1.14 | 33415 | 10.111.33.14 | 253 | FIN | 10:24:19 | 1 |
| 192.168.1.11 | 5001 | 10.55.3.5 | 101 | IDLE | 10:24:19 | 0 |
| | | | | NULL | | |
| | | | | NULL | | |
| | | | | NULL | | |
| | | | | NULL | | |

1323a

MEASUREMENT APPARATUS, COMMUNICATIONS APPARATUS, AND RELAY APPARATUS

CROSS REFERENCE TO RELATED APPLICATIONS

This application is a continuation application of International Application PCT/JP2013/076157, filed on Sep. 26, 2013 and designating the U.S., the entire contents of which are incorporated herein by reference.

FIELD

The embodiments discussed herein are related to a measurement apparatus, a communications apparatus, a relay apparatus, a measurement method, and a computer product.

BACKGROUND

To perform efficient communication through a network such as the Internet, it is important for a sender to comprehend how much traffic the network can handle and to perform transmission within the capacity of the network. Nonetheless, no method enabling one to directly know this exists and therefore, various measurement techniques have been used (for example, refer to Japanese Patent Nos. 4853319 and 4367505; Japanese Laid-Open Patent Publication Nos. 2006-074773 and 2006-340081; S. Floyd, T. Henderson, A. Gurtov, "The NewReno Modification to TCP's Fast Recovery Algorithm", RFC2582, Internet Engineering Task Force (IETF), 2003; and Lawrence S. Brakmo, Larry L. Peterson, "TCP Vegas: End to End Congestion Avoidance on a Global Internet", IEEE Journal on Selected Areas in Communications, Vol. 13, No. 8, pp. 1465-1480, 1995.

For example, Japanese Patent No. 4853319 discloses a technique in which a recipient observes a reception rate and notifies the sender of the reception rate. However, if such transmission band control is introduced into an existing communication procedure, a function for measurement is also added to a communication device on the receiving side. Japanese Patent No. 4367505 discloses that the sender estimates the reception rate for a recipient by measuring the pace of arrival of acknowledgment returned by the recipient to the sender or a round trip time (RTT) thereof. With this method, the capacity of the network can be estimated solely from information acquired by the sender. However, this measurement method has a problem in that the method is easily affected by the state of the network in the return path through which the acknowledgment is returned. In another conventional technique, feed-back control is used such that the transmission rate is gradually increased while monitoring for signs of the transmission rate having exceeded or exceeding the ability of the network such as packet loss and an increase in propagation delay (Japanese Laid-Open Patent Publication Nos. 2006-074773 and 2006-340081; S. Floyd, T. Henderson, A. Gurtov, "The NewReno Modification to TCP's Fast Recovery Algorithm," RFC2582, Internet Engineering Task Force (IFTF), 2003; and Lawrence S. Brakmo, Larry L. Peterson, "TCP Vegas: End to End Congestion Avoidance on a Global Internet," IEEE Journal on Selected Areas in Communications, Vol. 13, No. 8, pp. 1465-1480, 1995). Nonetheless, this technique has a problem in that the technique inherently requires time for convergence and is unable to deal with dynamic fluctuations in the network.

SUMMARY

According to an aspect of the present invention, a change in time on a receiving side is acquired from transmission time information appended to a message returned by the receiving side.

A relative time lapse on a reception terminal side is converted into a time scale on the transmitting side by estimating what conversion is performed on the receiving side to acquire the transmission time information from an actual time by monitoring a change thereof per unit time on the transmitting side.

Therefore, a measurement apparatus, a communications apparatus, a relay apparatus, a measurement method, and a measurement program are proposed in which, in data transfer through a data transfer procedure from a first communications apparatus to a second communications apparatus, an arrival rate at the second communications apparatus is calculated at the first communications apparatus by multiplying a data rate per unit change amount of transmission time information of the second communications apparatus by a time conversion factor between the first communications apparatus and the second communications apparatus and calculated based on first information that indicates a change amount of transmission time information appended by the second communications apparatus to each response message from the second communications apparatus to the first communications apparatus and second information that indicates a difference in arrival time of the response messages at the first communications apparatus.

The data rate is obtained based on the time conversion factor; third information that indicates progress of data transfer confirmed by two certain acknowledgement messages corresponding to transmission data from the first communications apparatus to the second communications apparatus; and fourth information that indicates a difference in transmission time information appended by the second communications apparatus to response messages from the second communications apparatus, between the two acknowledgement messages.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is a diagram of an example of a server according to the second embodiment;

FIG. 3C is a diagram of an example of hardware configuration of the server;

FIG. 4A is a diagram of an example of a format of a packet header of the TCP;

FIG. 4B is a diagram of an example of a time stamp encoding format;

FIG. 4C is a diagram of another example of the time stamp encoding format;

FIG. 5 is a diagram of an example of transmission/reception of signals between a server and a client;

FIG. 6 is a diagram of an example of variations in arrival rate;

FIG. 7 is a diagram of an example of a record table and calculation results according to the second embodiment;

FIG. 8 is a diagram of an example of a table stored in a server according to a third embodiment;

FIG. 9 is a diagram of an example of a table stored in a server according to a fourth embodiment;

FIG. 10 is a diagram of an example of a record table according to an eighth embodiment;

FIG. 11 is a diagram of an example of a record table and calculation results according to the eighth embodiment;

FIG. 12 is a diagram of an example of transmission/reception sequence for data transfer between a server and a client;

FIG. 14 is a diagram of an example of a connection management table.

DESCRIPTION OF EMBODIMENTS

Embodiments of a measurement apparatus, a communications apparatus, a relay apparatus, a measurement method, and a measurement program of the disclosure will be described in detail with reference to the accompanying drawings.

Figure 1:
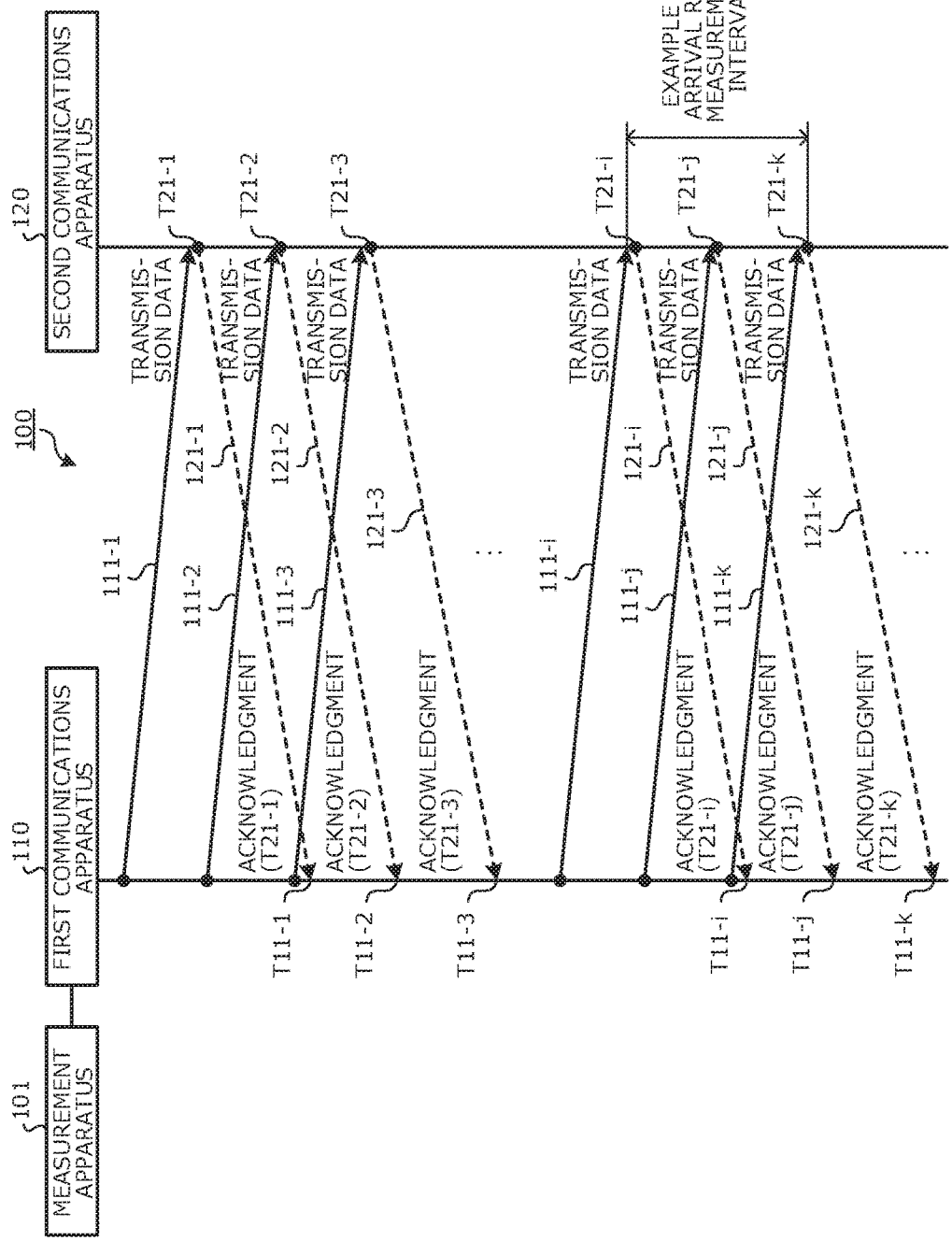
FIG. 1 is a diagram of an example of a communication system according to a first embodiment.

FIG. 1 is a diagram of an example of a communication system according to a first embodiment. As depicted in FIG. 1, a communication system 100 according to the first embodiment includes a first communications apparatus 110, a second communications apparatus 120, and a measurement apparatus 101. The first communications apparatus 110 and the second communications apparatus 120 communicate with each other.

The measurement apparatus 101 measures an arrival rate of transmission data at the second communications apparatus 120, the transmission data being transmitted from the first communications apparatus 110, for example. The measurement apparatus 101 may be an apparatus capable of communicating with the first communications apparatus 110 or may be an apparatus disposed on the first communications apparatus 110. When the measurement apparatus 101 is an apparatus capable of communicating with the first communications apparatus 110, the measurement apparatus 101 measures the arrival rate by receiving from the first communications apparatus 110, information, etc. concerning response messages received from the second communications apparatus 120 by the first communications apparatus 110. Herein, description will be given for a case where the measurement apparatus 101 is an apparatus disposed on the first communications apparatus.

Transmission data 111 is transmission data transmitted from the first communications apparatus 110 to the second communications apparatus 120. To distinguish each transmission data, a suffix (1 to 3, i, j, k) is appended. Response messages 121 are response messages that correspond to transmission data 111 and are transmitted from the second communications apparatus 120 to the first communications apparatus 110. Similarly, to distinguish each message, a suffix (1 to 3, i, j, k) is appended.

Each of the response messages 121 has transmission time information T21 appended thereto by the second communications apparatus 120 (a corresponding suffix (1 to 3, i, j, k) is appended to time information added to each of the messages). The transmission time information T21 is appended according to the time of transmission of the corresponding response message 121 from the second communications apparatus 120. Therefore, the transmission time information T21 is time information generated on the basis of a time base (internal time) of the second communications apparatus 120. The measurement apparatus 101 can acquire the transmission time information T21 from the response message 121 received by the first communications apparatus 110. The relation between the transmission time information T21 and the actual time is implementation-dependent on the second communications apparatus 120, and the first communications apparatus 110 cannot directly acquire the time of transmission of the response message by the second communications apparatus 120 from a value of the transmission time information T21.

An arrival time T11 is the arrival time of a response message 121 at the first communications apparatus 110. Suffixes (1 to 3, i, j, k) identical to those of the respective corresponding response messages 121 are appended. It is noted that the arrival time T11 is a transmission time that is based on the time base of the first communications apparatus 110.

In the example depicted in FIG. 1, description will be given for a case of measuring an arrival rate at the second communications apparatus 120 with respect to the transmission data 111-*i* to 111-*k*. In this case, the measurement apparatus 101 acquires the transmission time information T21-*i*, T21-*k* of the response messages 121-*i*, 121-*k* for the transmission data 111-*i*, 111-*k*. Here, (T21-*k*)−(T21-*i*) (fourth information) represents information of the time required for the arrival of the transmission data 111-*i* to 111-*k* based on the time base of the second communications apparatus 120.

The measurement apparatus 101 acquires a total data amount D (third information) between the transmission data 111-*i* and 111-*k*. To efficiently perform data transfer in a data transfer procedure between two parties experiencing propagation delay or response delay, one party must permit transmission of a certain amount of data without receiving acknowledgement from the other party. In this case, the data transfer procedure must enable the sender to identify the transmission data that an acknowledgement returned by a receiver corresponds to. In a data transmission procedure equipped with such a mechanism, information included in an acknowledgment includes information that indicates the data that the acknowledgment corresponds to, and the amount of arriving data between two response messages can generally be known by analyzing this information. Therefore, the measurement apparatus 101 can calculate the arrival rate of the transmission data 111-*i* to 111-*k* based on the time base of the second communications apparatus 120 from D/((T21-*k*)−(T21-*i*)).

The measurement apparatus 101 calculates a ratio (time conversion factor) between the time base of the first communications apparatus 110 and the time base of the second communications apparatus 120. Therefore, the measurement apparatus 101 acquires the transmission time information T21-1, T21-2 of the response messages 121-1, 121-2 for the transmission data 111-1, 111-2, for example. The measurement apparatus 101 also acquires the arrival times T11-1, T11-2 of the response messages 121-1, 121-2. The measurement apparatus 101 calculates the ratio of a difference (first information) between the acquired transmission time information T21-1 and T21-2 to a difference (second information) between the acquired arrival times T11-1 and T11-2: ((T21-2)−(T21-1))/((T11-2)−(T11-1)) to calculate the time conversion factor.

For example, although the measurement apparatus 101 may utilize the first two messages as the response messages used for acquiring the time conversion factor as in the example above, as another example, the measurement apparatus 101 may calculate the time conversion factor from the response messages 121-1, 121-$k$ of the transmission data 111-1, 111-$k$. By calculating the time conversion factor from the two messages having longer transmission interval than the period for measurement, the time conversion factor between the first communications apparatus 110 and the second communications apparatus 120 can be calculated accurately.

The measurement apparatus 101 may measure a time conversion factor multiple times, sequentially averaging the factors. This enables accurate calculation of the time conversion factor between the first communications apparatus 110 and the second communications apparatus 120 even when the response messages 121 vary in amount of delay until arrival.

The measurement apparatus 101 multiplies, for example, the calculated arrival rate of the transmission data 111-$i$ to 111-$k$ per unit change amount of the transmission time information based on the time base of the second communications apparatus 120 by the calculated time conversion factor between the first communications apparatus 110 and the second communications apparatus 120. As a result, the arrival rate of the transmission data 111-$i$ to 111-$k$ can be calculated on a basis of the time base of the first communications apparatus 110.

For example, when using the time conversion factor based on the response messages 121-1, 121-$k$, the measurement apparatus 101 can multiply D/((T21-$k$)−(T21-$i$)) by ((T21-$k$)−(T21-1))/((T11-$k$)−(T11-1)) so as to calculate the arrival rate of the transmission data 111-$i$ to 111-$k$ based on the time base of the first communications apparatus 110.

The above calculation procedure is an example and may be arbitrarily modified arithmetically in practice consequent to the method of retaining numerical values, the number of effective digits, or to optimize the number of calculation steps, etc.

As described above, the measurement apparatus 101 according to the first embodiment can measure the arrival rate of two given response messages at the second communications apparatus 120 on the receiving side, based on information easily acquired by the first communications apparatus 110 without adding a function to the second communications apparatus 120. The measurement apparatus 101 measures the arrival rate by using a returned data amount acquired by analyzing acknowledgement information in response messages received by the first communications apparatus 110 on the transmitting side, a change amount of the transmission time information indicated by the response messages, and the time conversion factor acquired from a relation between the transmission time information and the arrival times of the response messages A specific form of implementation of the transmission time information is a time stamp. One party on the transmitting side can calculate a time lapse on the receiving side from time stamp information appended by the other party so as to achieve measurement of a data arrival rate by a method that enables the measurement solely through a process on the receiving side and that is not affected by (is resistant to the effects of) the network state of the return path.

The time stamp is, for example, information concerning the transmission time of a packet and is embedded in the packet. Time stamps are recently employed in specifications of data transfer protocols etc., to clarify the temporal context of messages and measure RTT.

Assuming that, in a configuration of transferring packetized transmission data and returning a response message thereof also as a packet, a response packet (e.g., Ack packet) for a data packet is quickly returned by the receiving side, if the transmission times of the response packets can be determined from the time stamps, the arrival rate on the receiving side can be estimated from progress in the time stamps and progress in an amount of acknowledged data.

In the Transmission Control Protocol (TCP, RFC793), inclusion of time stamp information in a packet is defined as an option in RFC1323. In this option, time information concerning transmission of a packet is digitized and embedded as a time stamp in a form suited to a field size defined by protocol specifications. This time stamp is embedded in a TCP header in a packet in the case of the TCP (see, e.g., FIGS. 4A to 4C).

For use in RTT measurement, the specification of RFC1323 not only requires that a time stamp corresponding to a transmission time point be stored to a packet and transmitted but also requires that a time stamp value of a corresponding data packet be stored to a response packet. Therefore, under RFC1323, a field (TSval) storing a time stamp on the packet transmitting side is prepared along with a field (TSecr) for storing a time stamp of a data packet on the receiving side of the data packet as echo back in a response packet for the data packet (see FIGS. 4B and 4C).

However, a time stamp may generally indicate, for example, a temporal context to the other party (e.g., monotonic increase in value) such that an RTT can be measured at predetermined accuracy by using an echoed-back value. Also in RFC1323 described above, the relation between the value of the time stamp and the time is specified only as a "value substantially proportional to actual time (elapse)." Therefore, the amount of time that elapses corresponding to one unit of the time stamp is implementation-dependent and a constant pace of increase in the time stamp is not guaranteed.

Thus, in a second embodiment, the transmitting side of data packets measures the speed at which time stamps change on the receiving side, using the progress of the time stamps included in response packets for the data packets and the elapsed time of the arrival times of the response packets at the transmitting side. In recent communication systems, communications apparatuses generally have a reference for the time having the accuracy of crystal oscillation (clock). Therefore, although a variable factor exists that is derived from a mechanism generating time stamps (e.g., variation in the time of response to timer interruption), the time stamps maintain a stable pace of increase for a long time.

One-way delay after transmission of a response packet on the data-packet receiving side until reception of the response packet on the data-packet transmission side also varies due to variations in queuing delay enroute. However, although a temporary fluctuation may occur, the impact of this variation on a measurement value is minimized by averaging over a long period of time.

If a change rate (clock ratio) of time stamps included in response packets is known by such a method, an elapse of time can be known from the time stamps included in the response packets. As a result, an arrival rate on the receiving side can be measured with respect to two response packets from a difference in transmission time thereof and data amounts of transmission packets.

If the time stamps are generated based on a clock, the same value should be acquired as the clock ratio in principle and therefore, a measurement time may be made longer so as to reduce measuring error of the clock ratio. On the other hand, excessive smoothing of time intervals of response packets used for calculating the arrival rate may cause inconvenience because the arrival rate is assumed to constantly change. As described above, since a pair of response packets used in the calculation of the clock ratio have requirements different from those of a pair of response packets used in the calculation of the arrival rate, the clock ratio and the arrival rate may be calculated based on respectively different packet pairs.

Figure 2:
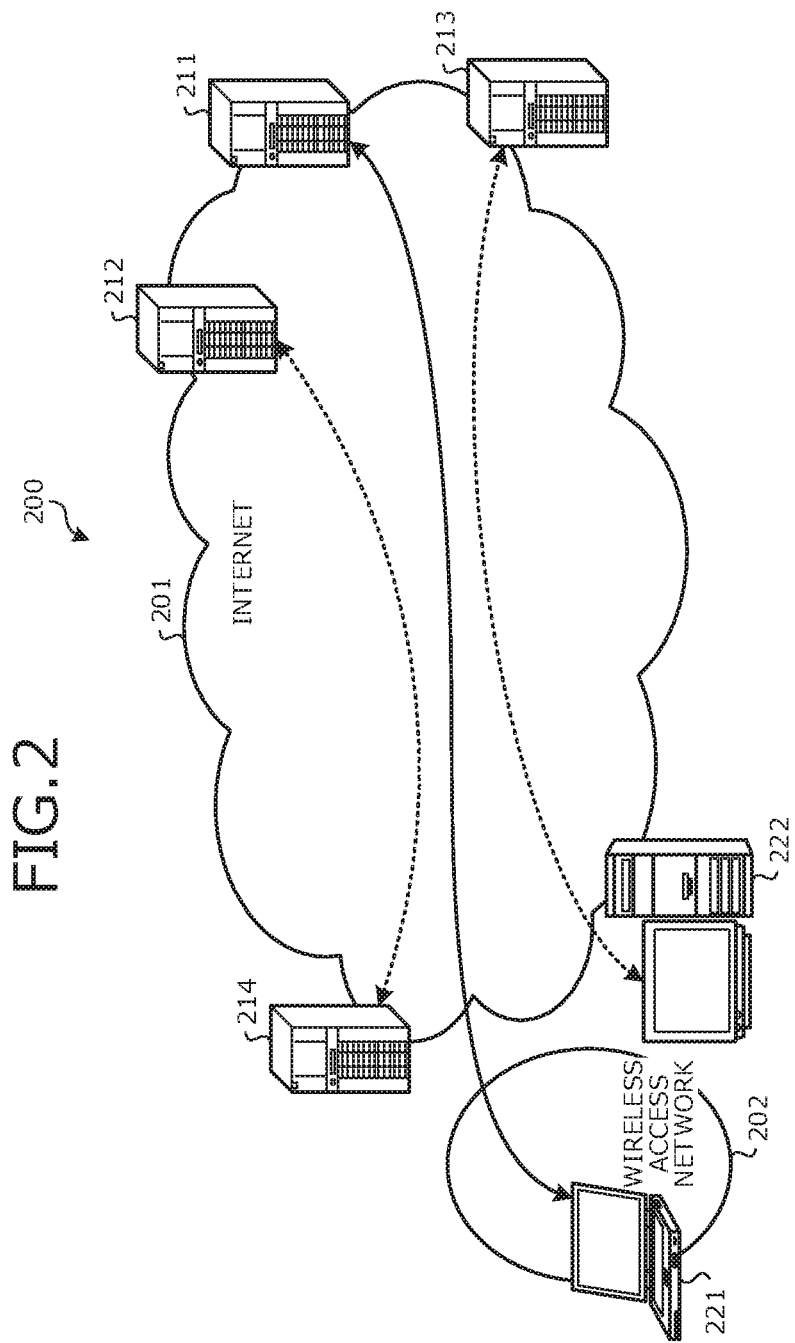
FIG. 2 is a diagram of an example of a communication system according to a second embodiment.

FIG. 2 is a diagram of an example of a communication system according to the second embodiment. As depicted in FIG. 2, a communication system 200 according to the second embodiment includes servers 211 to 214 and clients 221, 222. The servers 211 to 214 are connected to an internet 201. The clients 221, 222 are connected via a wireless access network 202 to the internet 201.

For example, when data packets are transmitted from the server 211 to the client 221, the measurement apparatus 101 and the first communications apparatus 110 depicted in FIG. 1 are applicable to the server 211, for example. The second communications apparatus 120 depicted in FIG. 1 is applicable to the client 221, for example. In this description, the server 211 measures an arrival rate at the client 221 with respect to data packets from the server 211 to the client 221. The server 211 controls a sending rate of data packets to the client 221 according to the measured rate of the arrival rate.

The data packets from the server 211 to the client 221 are transferred by using the TCP, for example.

Figure 3B:
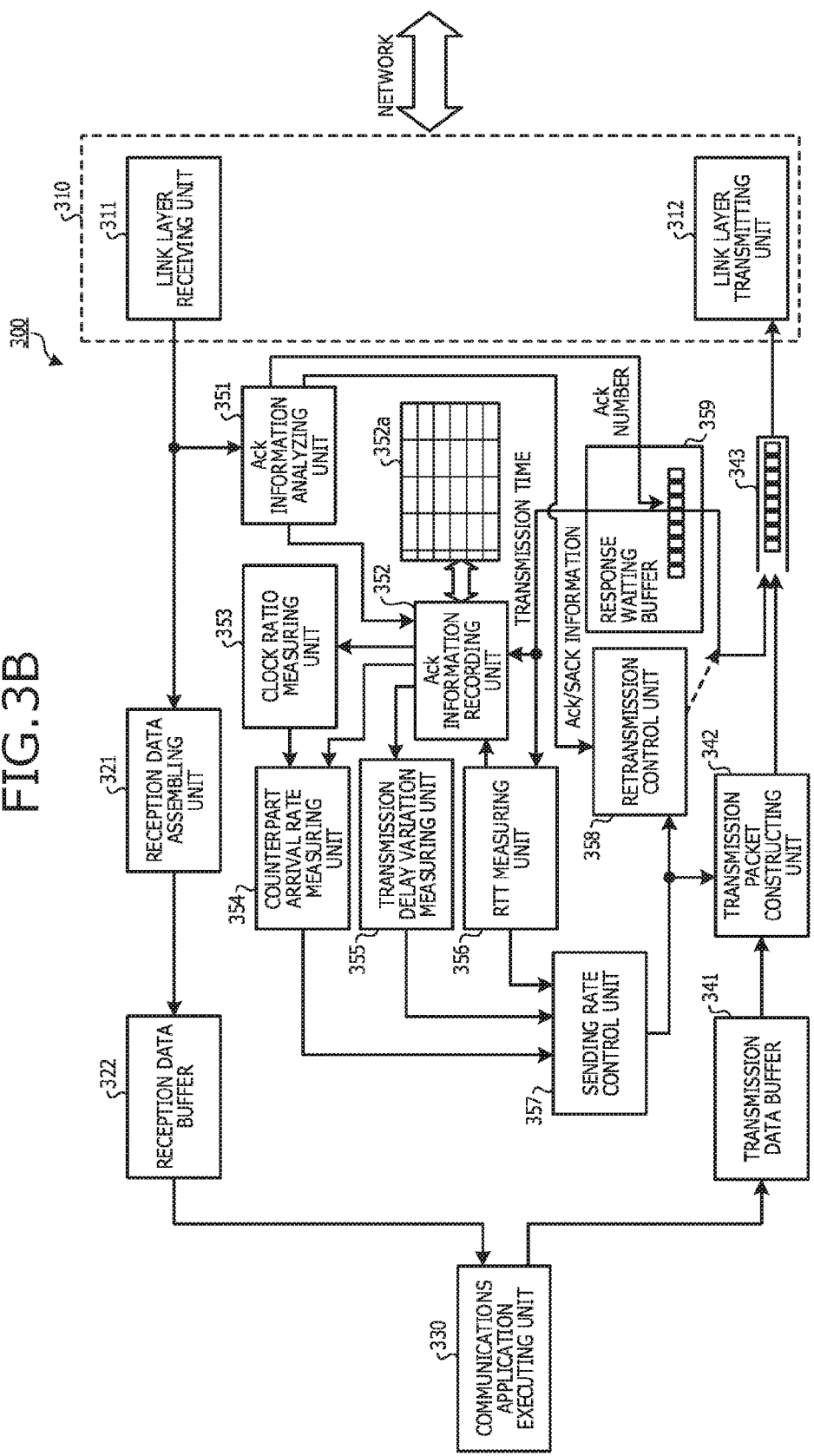
FIG. 3B is a diagram of an example of signal flow in the server depicted in FIG. 3A.

FIG. 3A is a diagram of an example of a server according to the second embodiment. FIG. 3B is a diagram of an example of signal flow in the server depicted in FIG. 3A. The server 211 depicted in FIG. 2 can be implemented by a server 300 depicted in FIGS. 3A and 3B, for example. The server 300 has a link layer processing unit 310, a reception data assembling unit 321, a reception data buffer 322, a communications application executing unit 330, a transmission data buffer 341, a transmission packet constructing unit 342, and a transmission queue 343.

The server 300 includes an Ack information analyzing unit 351, an Ack information recording unit 352, a clock ratio measuring unit 353, and a counterpart arrival rate measuring unit 354. The server 300 includes a transmission delay variation measuring unit 355, an RTT measuring unit 356, a sending rate control unit 357, a retransmission control unit 358, and a response waiting buffer 359.

The link layer processing unit 310 includes a link layer receiving unit 311 and a link layer transmitting unit 312. The link layer receiving unit 311 receives packets from a network (e.g., the internet 201 of FIG. 2). The packets received by the link layer receiving unit 311 include data packets from another communications apparatus (e.g., the client 221 of FIG. 2) and response packets from another communications apparatus (e.g., the client 221 of FIG. 2) for data packets transmitted by the server 300. The link layer receiving unit 311 outputs received packets to the reception data assembling unit 321 and the Ack information analyzing unit 351. The link layer transmitting unit 312 sequentially reads packets stored in the transmission queue 343 and transmits the packets to the network (e.g., the internet 201 of FIG. 2).

The reception data assembling unit 321 acquires data packets among the packets output from the link layer receiving unit 311. The reception data assembling unit 321 assembles the acquired data packets and outputs data acquired through the assembly to the reception data buffer 322. The reception data buffer 322 primarily stores the data output from the reception data assembling unit 321 and sequentially outputs the stored data to the communications application executing unit 330.

The communications application executing unit 330 executes a communications application. The communications application exchanges data with a communication counterpart. As part of this data exchange, the communications application executes a process based on data output from the reception data buffer 322 and a process of generating data to be transmitted to another communications apparatus and outputting the data to the transmission data buffer 341. The transmission data buffer 341 primarily stores the data output from the communications application executing unit 330 and sequentially outputs the stored data to the transmission packet constructing unit 342.

The transmission packet constructing unit 342 constructs packets to be transmitted to a communication counterpart, based on the data output from the transmission data buffer 341. The transmission packet constructing unit 342 stores the constructed packets into the transmission queue 343. The sending rate control unit 357 controls a rate of the packets stored by the transmission packet constructing unit 342 into the transmission queue 343.

The retransmission control unit 358 reads out packets from the response waiting buffer 359 to the transmission queue 343, based on Ack/SACK (Selective Ack; Ack for partial receipt of data) information output from the Ack information analyzing unit 351, thereby providing retransmission control.

The response waiting buffer 359 temporarily stores packets already transmitted by the server 300. Under the control of the retransmission control unit 358, the response waiting buffer 359 stores a packet corresponding to an Ack number output from the Ack information analyzing unit 351 into the transmission queue 343, among the stored packets. The response waiting buffer 359 outputs to the Ack information recording unit 352 and the RTT measuring unit 356, the transmission times of packets transmitted from the server 300.

The Ack information analyzing unit 351 acquires response packets among the packets output from the link layer receiving unit 311 and analyzes the acquired response packets. The Ack information analyzing unit 351 outputs to the Ack information recording unit 352, Ack information that indicates the contents of Ack packets of the acquired response packets. The Ack information analyzing unit 351 outputs to the retransmission control unit 358, Ack/SACK information that indicates the acquired response packets. The Ack information analyzing unit 351 outputs to the response waiting buffer 359, Ack numbers of the Ack packets of the acquired response packets.

The Ack information recording unit 352 records the Ack information output from the Ack information analyzing unit 351 into a record table 352a. The record table 352a is a table stored in a memory of the server 300 (see, e.g., FIG. 7).

The Ack information recording unit 352 outputs to the clock ratio measuring unit 353, the Ack information of two Ack packets, from the Ack information recorded in the record table 352a. The Ack information recording unit 352 may output the Ack information of multiple sets of Ack packets to the clock ratio measuring unit 353. The Ack information recording unit 352 outputs to the counterpart arrival rate measuring unit 354, the Ack information of multiple Ack packets during a period for measurement, among the Ack information recorded in the record table 352a.

The Ack information recording unit 352 may output to the transmission delay variation measuring unit 355, the Ack information (including transmission times of data packets) of multiple Ack packets during the period for measurement, among the Ack information recorded in the record table 352a.

The Ack information recording unit 352 associates and records into the record table 352a, the transmission times output from the response waiting buffer 359 and the Ack packets of the corresponding transmission data. Alternatively, the Ack information recording unit 352 may associate and record into the record table 352a, an RTT output from the RTT measuring unit 356 and the Ack packet of the corresponding transmission data.

The clock ratio measuring unit 353 measures a clock ratio (time conversion factor) between the server 300 and the client 221 based on the Ack information of two Ack packets, or the Ack information of multiple sets of Ack packets, output from the Ack information recording unit 352. The clock ratio measuring unit 353 outputs the measured clock ratio to the counterpart arrival rate measuring unit 354.

The counterpart arrival rate measuring unit 354 measures an arrival rate at the server 300 based on the Ack information of multiple Ack packets output from the Ack information recording unit 352 and the clock ratio output from the clock ratio measuring unit 353. The counterpart arrival rate measuring unit 354 outputs the measured arrival rate to the sending rate control unit 357.

The transmission delay variation measuring unit 355 measures delay time variations of the transmission data from the server 300 based on the Ack information (including the transmission times of data packets) of multiple Ack packets during the period for measurement output from the Ack information recording unit 352. The transmission delay variation measuring unit 355 outputs a measurement result of the variations in delay time to the sending rate control unit 357.

The RTT measuring unit 356 measures an RTT based on the transmission times output from the response waiting buffer 359. The RTT measuring unit 356 outputs the measured RTT to the Ack information recording unit 352 and the sending rate control unit 357.

The sending rate control unit 357 controls the sending rate of packets from the server 300 based on the arrival rate output from the counterpart arrival rate measuring unit 354. For example, the sending rate control unit 357 controls the transmission packet constructing unit 342 and the retransmission control unit 358 so as to control the sending rate.

In the second embodiment, configuration may be such that the transmission delay variation measuring unit 355 and the RTT measuring unit 356 of the server 300 are omitted.

FIG. 3C is a diagram of an example of hardware configuration of the server. The server 300 depicted in FIGS. 3A and 3B, for example, is implemented by a communications apparatus 380 depicted in FIG. 3C. The communications apparatus 380 includes a central processing unit (CPU) 381, random access memory (RAM) 382, non-volatile memory 383, and a communications interface 384. The CPU 381, the RAM 382, the non-volatile memory 383, and the communications interface 384 are connected by a bus 389.

The CPU 381 governs overall control of the communications apparatus 380. The RAM 382 is used as a work area of the CPU 381. The non-volatile memory 383, for example, is non-volatile memory such as a magnetic disk, an optical disk, flash memory, and the like. The non-volatile memory 383 stores various programs that run the communications apparatus 380. A program stored in the non-volatile memory 383 is loaded to the RAM 382 and executed by the CPU 381.

The communications interface 384, for example, is a communications interface that by a physical line, communicates with apparatuses external to the communications apparatus 380 (e.g., the client 221). The communications interface 384 is controlled by the CPU 381.

The link layer processing unit 310 depicted in FIGS. 3A and 3B can be implemented by the communication interface 384, for example. The reception data assembling unit 321, the communications application executing unit 330, and the transmission packet constructing unit 342 depicted in FIGS. 3A and 3B can be implemented by the CPU 381, for example.

The Ack information analyzing unit 351, the Ack information recording unit 352, the clock ratio measuring unit 353, the counterpart arrival rate measuring unit 354, the transmission delay variation measuring unit 355, and the RTT measuring unit 356 depicted in FIGS. 3A and 3B can be implemented by the CPU 381, for example. The sending rate control unit 357 and the retransmission control unit 358 depicted in FIGS. 3A and 3B can be implemented by the CPU 381, for example.

The reception data buffer 322, the transmission data buffer 341, the transmission queue 343, and the response waiting buffer 359 depicted in FIGS. 3A and 3B can be implemented by the RAM 382, for example. The record table 352a depicted in FIGS. 3A and 3B is stored in the RAM 382, for example.

A calculating unit calculating an arrival rate of the measurement apparatus 101 depicted in FIG. 1 can be implemented by the CPU 381, for example.

FIG. 4A is a diagram of an example of a format of a packet header of the TCP. In the TCP, for example, a format 410 of the packet header depicted in FIG. 4A is defined. For example, in "Sequence Number" of the format 410, a sequence number of a data packet is stored by the transmitting side of the data packet.

On the other hand, the receiving side of the data packet sets a flag "ACK" and returns a response packet in which the sequence number of the received data packet is stored in "Acknowledgement Number." Since the TCP supports bidirectional data communication, a packet without the flag "ACK" set is used only in special cases. The sequence number on the packet header has a randomly determined initial value and is, therefore, set to a value increased by the initial value from the original order of the data packet. However, the initial value can be ignored in a process based on a difference in the sequence number.

The receiving side of the data packet stores a time stamp in a predetermined encoding format (see, e.g., FIGS. 4B and 4C) in an option region 411 of "Options" of the response packet to be transmitted, for example.

FIG. 4B is a diagram of an example of a time stamp encoding format. For example, an encoding format 420 depicted in FIG. 4B can be used for the time stamp stored in the option region 411 of the response packet by the receiving side of the data packet. "TSval" is a time stamp appended by the packet-transmitting side. "TSecr" is a time stamp (TSval value) stored in a received packet and is a time stamp echoed-back to the other party.

FIG. 4C is a diagram of another example of the time stamp encoding format. For example, an encoding format 430 depicted in FIG. 4C may be used for the time stamp stored in the option region 411 of the response packet by the receiving side of the data packet.

If only the time stamp is stored in the option region 411, No Operation (NOP) option may be used together as in the encoding format 430 for position adjustment so as not to allow the time stamp to cross a word boundary. As a result, the data can be aligned.

FIG. 5 is a diagram of an example of transmission/reception of signals between a server and a client. In FIG. 5, Data(x) indicated by a solid arrow is an x-th data packet transmitted from the server 211 to the client 221. Ack(x) indicated by a dotted arrow is a response packet for Data(x) from the client 221 to the server 211.

TSv(x) is a time stamp appended to Ack(x) by the client 221. Therefore, TSv(x) indicates a time based on the time base (clock) of the client 221.

$\Delta$Tas(i,j) is the difference of the time of transmission of Ack(i) by the client 221 and the time of transmission of Ack(j) by the client 221 (i<J). It is noted that the server 211 cannot directly acquire $\Delta$Tas(i,j). Therefore, the server 211 uses $\Delta$Tar(i,j) as a value close to $\Delta$Tas(i,j). $\Delta$Tar(i,j) is the difference of the time of arrival of Ack(i) at the server 211 and the time of arrival of Ack(j) at the server 211.

The server 211 calculates Tsv(j)−Tsv(i) as the difference of the time stamps appended to the arriving Ack(i) and Ack(j). The server 211 divides the calculated Tsv(j)−Tsv(i) by $\Delta$Tar(i,j). As a result, the server 211 can calculate a ratio (clock ratio) of the clock of the server 211 to the clock of the client 221.

The server 21 may calculate multiple clock ratios based on multiple sets of Ack(i) and Ack(j) having a certain temporal difference and may calculate an averaged clock ratio from the calculated multiple clock ratios. Averaging may be implemented by using simple arithmetic averaging or by averaging using a recurrence formula such as Exponentially Weighted Moving Average (EWMA).

Variations in arrival delay time of Ack(x) is at most within a period shorter than the RTT. Therefore, if the arrival delay time of Ack(x) varies, the clock ratio can be calculated accurately by averaging multiple clock ratios as long as the RTT is basically stable.

The server 211 calculates a rate by dividing a total data amount of a measured data packet group by a difference of the time stamps of response packets for first and last data packets of the measured data packet group. The total data amount of the measured data packet group can be acquired by multiplying the difference of Ack numbers of the response packets for the first and last data packets of the measured data packet group (or the difference +1) by the data amount of one data packet.

The server 211 can multiply the calculated rate by the calculated clock ratio to calculate the arrival rate at the client 221 with respect to the measured data packet group on the basis of the time base of the server 211.

FIG. 6 is a diagram of an example of variations in the arrival rate. In FIG. 6, the horizontal axis indicates an elapsed time and the vertical axis indicates an arrival rate of data packets from the server 211 to the client 221. A physical band upper limit 610 is an upper limit of a physical band in the transfer of data packets from the server 211 to the client 221. An arrival rate 601 is an arrival rate measured when a window size is sufficiently reduced. As indicated by the arrival rate 601, a case of a small window size is as depicted in FIG. 6 at a micro level.

A measurement result 602 is an arrival rate measured when the window size is set to a certain size $\Delta$W1. As indicated by the measurement result 602, when the window size is a certain size, the physical band upper limit 610 can be measured.

A measurement result 603 is an arrival rate measured when the window size is $\Delta$W2 (>$\Delta$W1). As indicated by the measurement result 602, when the window size is larger, the detection sensitivity to the physical band upper limit 610 decreases.

A measurement result 604 is an arrival rate measured when the window size has a width corresponding to the RTT. As indicated by the measurement result 604, when the window size has a width corresponding to the RTT, only a low rate can be measured.

Other traffic 620 is other traffic putting pressure on the band of the data packets from the server 211 to the client 221. A measurement result 605 is an arrival rate measured when the window size is set to a certain size $\Delta$W3. As indicated by the measurement result 605, when the window size is a certain size, a peak value of the arrival rate is measured at a level reduced by the other traffic 620.

FIG. 7 is a diagram of an example of a record table and calculation results according to the second embodiment. The Ack information recording unit 352 records a record table 710 depicted in FIG. 7, for example. In the record table 710, each response packet is correlated with an arrival time, an Ack number, and a TS (TSval) value. Although the arrival time is represented in seconds in the example depicted in FIG. 7, the arrival time is represented in an implementation-dependent manner and may be replaced with the internal clock of the server 211, for example.

In the example depicted in FIG. 7, the number of entries of the record table 710 is 32. It is noted that the number of entries of the record table 710 may be a minimum value at which Ack information desired to be retrospectively referred to remains. For ease of implementation, the number of entries of the record table 710 may be a power of two. When all available entries of the record table 710 have been entered, the Ack information recording unit 352 overwrites older entries.

Calculation results 720 depicted in FIG. 7 are calculation results of a clock ratio based on the record table 710. The calculation results 720 represent calculation results in the respective entries, and configuration may be such that all the calculation results 720 corresponding to the entries are not retained. In the example depicted in FIG. 7, description will be given taking a case where the clock ratio is measured from a difference from the Ack reception information of past 16 entries. The calculation results 720 indicate arrival time (j)−arrival time(j−16), TS(j)−TS(j−16), clock ratios, and average clock ratios.

For example, the server 211 calculates from Ack(31) and Ack(15) (j=16), arrival time(31)−arrival time(15)= 0.405108−0.304262=0.100846. The server 211 calculates TS(31)−TS(15)=39062−39012=50. The server 211 then calculates 50/0.100846≈495.8 (rounded to the first decimal place) as the clock ratio based on Ack(31) and Ack(15).

Similarly, the server 211 calculates the clock ratio based on Ack(30) and Ack(14), the clock ratio based on Ack(29) and Ack(13), etc. and averages the calculated clock ratios. Although the number of traced-back entries is a fixed value in the example depicted in FIG. 7, since the Ack reception amount increases as the packet transmission amount per unit time increases, the frequency of recording the information of Ack packets may be culled depending on a data transmission amount.

Although the past clock ratios are simply averaged in the example depicted in FIG. 7, averaging using a recurrence formula such as EWMA may be used as described above. Instead of calculating the clock ratios by a technique in a sliding-window manner, a ratio may be acquired between an elapsed time from the first Ack packet and a TS change amount. In particular, the time for acquiring the total can be made longer to make a variable component smaller when the ratio is acquired.

As described above, according to the second embodiment, the arrival rate at the client 221 can be measured at the server 211 without adding a function to the client 221. A method of the measurement can be adjusted to acquire a measurement result suited to the form of use of the data rate to be measured.

This measurement result can be used to control the sending rate of a data transfer protocol so as to estimate band available to the client 221 or to detect vacancy of the available band. Therefore, more suitable adjustment can be made according to the sending rate and the available band so as to achieve improved communication throughput and network utilization efficiency.

In the description of a third embodiment, portions different from the second embodiment will be described. If the clock is generated by crystal oscillation and a timer is implemented by increasing a count by acquiring the clock at constant time intervals such as a period of 1 [ms] or 10 [ms], the clock ratio is expected to have limited values.

Therefore, in the third embodiment, a clock ratio table 800 that indicates multiple candidates of the clock ratio can be used for substituting a closest value for a calculated clock ratio, so as to accurately estimate the clock ratio.

FIG. 8 is a diagram of an example of a table stored in a server according to the third embodiment. For example, the clock ratio table 800 depicted in FIG. 8 is stored in memory (e.g., the RAM 382 of FIG. 3C) of the server 211 according to the third embodiment. In the clock ratio table 800, each among multiple candidates of the clock ratio is correlated with a clock conversion factor and a comment. The comment may not be included in the clock ratio table 800.

The clock conversion factor is a factor for converting a time stamp change amount into time. Assuming that arithmetic operations by a processor are executed at a higher speed in the case of multiplication as compared to division, the clock conversion factor is a reciprocal of the clock ratio in the clock ratio table 800 depicted in FIG. 8. The values of the clock ratio table 800 are scaled by a value that is a power of two (1024 in the example depicted in FIG. 8), so that the operations are easily executed as integer operations in the processor.

The server 211 identifies a clock ratio closest to a calculated clock ratio among the clock ratio candidates indicated in the clock ratio table 800. The server 211 multiplies a rate calculated on the basis of the time base of the client 221, by the clock conversion factor corresponding to the identified clock ratio and divides the product by 1024. As a result, the arrival rate based on the server 211 can be calculated.

For example, if the calculated clock ratio is 910, the server 211 identifies 1024 as being the closest to 910 among the clock ratio candidates indicated by the clock ratio table 800. The server 211 multiplies a rate calculated on the basis of the time base of the client 221 by 1024, which is the clock conversion factor corresponding to 1024 in the clock ratio table 800, and divides the product by 1024.

As described above, the server 211 according to the third embodiment identifies among multiple candidates of the clock ratio (time conversion factor), the clock ratio closest to a calculated clock ratio. The server 211 can multiply a rate based on the time base of the client 221 by the identified clock ratio to calculate the arrival rate. As a result, the clock ratio can be measured accurately and the arrival rate based on the clock can be measured accurately.

In the description of a fourth embodiment, portions different from the third embodiment will be described.

FIG. 9 is a diagram of an example of a table stored in a server according to the fourth embodiment. For example, the clock ratio table 800 depicted in FIG. 9 is stored in memory (e.g., the RAM 382 of FIG. 3C) of the server 211 according to the fourth embodiment. In the clock ratio table 800 depicted in FIG. 9, each among multiple candidates of the clock ratio is correlated with a range (min) and a range (max) in addition to the items depicted in FIG. 8. The range (min) and the range (max) are ranges having a clock ratio of a corresponding candidate as a median.

The server 211 identifies a range that includes a calculated clock ratio among the ranges (min) and the ranges (max) indicated in the clock ratio table 800. The server 211 multiplies a rate calculated on the basis of the time base of the client 221 by the clock conversion factor corresponding to the identified range and divides the multiplication result by 1024. As a result, the arrival rate based on the server 211 can be calculated.

If a calculated clock ratio is not included in any range, the server 211 executes a process of a clock ratio measurement error, for example. In this case, the server 211 does not provide control of the sending rate by using the arrival rate based on the clock ratio.

As described above, if a calculated clock ratio is included in none of the multiple ranges of the clock ratio, the server 211 according to the fourth embodiment does not control the sending rate by using the arrival rate based on the calculated clock ratio. Therefore, if the client 221 uses an unexpected clock, the server 211 can avoid a reduction in transmission efficiency due to controlling the sending rate by using a low-accuracy arrival rate based on unsuitable clock ratio.

In the description of a fifth embodiment, portions different from the second embodiment will be described. The server 211 according to the fifth embodiment measures a clock ratio multiple times and calculates a variation amount of the clock ratio measured multiple times. The calculation of the variation amount of the clock ratio can be performed by using variance, standard deviation, mean deviation, etc.

If a calculated variation amount is greater than or equal to a predetermined magnitude, the server 211 executes a process of a clock ratio measurement error, for example. In this case, the server 211 does not measure the arrival rate based on the clock ratio. As a result, for example, if the time stamp of the client 221 does not exhibit a constant pace of increase (i.e., cannot be used in terms of a time scale), the server 211 can prevent the measurement of the arrival rate based on the time stamp of the client 221.

As described above, if the variation in the clock ratio (time conversion factor) is greater than or equal to a predetermined magnitude, the server 211 according to the fifth embodiment does not control the sending rate by using the arrival rate based on the clock ratio. Therefore, the server 211 can avoid a reduction in transmission efficiency due to controlling the sending rate by using a low-accuracy arrival rate based on a low-accuracy clock ratio.

In the description of a sixth embodiment, portions different from the second embodiment will be described. The server 211 according to the sixth embodiment measures the clock ratio from the start of communication with the client 221 and terminates the measurement of the clock ratio after the clock ratio has been measured once. The server 211 uses the measured clock ratio to subsequently calculate the arrival rate multiple times. As a result, a processing amount for calculating the clock ratio can be reduced at the server 211.

For example, when constant changes based on time can be assured in the implementation of time stamp in partner communication terminals (including servers and gateways) such as when communication counterparts are limited to terminals in a company intranet, the clock ratio is constant and is therefore effective.

As described above, the server 211 according to the sixth embodiment uses one calculated clock ratio (time conversion factor) to calculate multiple arrival rates of different periods. As a result, a processing amount for calculating the clock ratio can be reduced in the server 211.

In the description of a seventh embodiment, portions different from the second embodiment will be described. The server 211 according to the seventh embodiment measures the clock ratio from the start of communication with the 221 and continues the measurement of the clock ratio after the clock ratio is measured once.

As described above, the server 211 according to the seventh embodiment continuously calculates clock ratio (time conversion factor) during communication between the server 211 and the client 221. As a result, even when the clock ratio varies between the server 211 and the client 221, the arrival rate at the client 221 can accurately be measured.

In the description of an eighth embodiment, portions different from the second embodiment will be described.

FIG. 10 is a diagram of an example of a record table according to the eighth embodiment. For example, the record table 352*a* depicted in FIG. 10 is stored in memory (e.g., the RAM 382 of FIG. 3C) of the server 211 according to the eighth embodiment. The Ack number and the time stamp of the record table 352*a* are values of a response packet, stored in the flag "ACK" of the TCP header of FIG. 4A and the TSval field of FIGS. 4B and 4C.

The transmission time is the time of transmission of a data packet corresponding to the response packet from the server 211. In a processing system difficult to directly acquire the transmission time, the transmission time may be acquired from an echo back value TSecr of the time stamp, for example. Alternatively, an RTT measurement result for a response packet may be acquire from the system to back calculate the transmission time by subtracting the RTT from the arrival time of the response packet. In the eighth embodiment, configuration may be such that the transmission time is not included in the items of the record table 352*a*.

The server 211 uses, for example, the latest response packet and a response packet received in the past in the measurement of the clock time. In this case, for example, the server 211 uses the record table 352*a* as depicted in FIG. 10 so as to flexibly trace back response packets from the latest packet to acquire a packet in the past.

When receiving response packets, the server 211 records the response packets while sequentially advancing storage entries of the record table 352*a*. Therefore, if the arrival intervals of the response packets are known to a certain extent, information concerning the response packets having a desired time difference can be ensured. Therefore, a time span used for calculation is easily changed as appropriate.

When calculating a total data amount from an i-th data packet to a j-th data packet, the server 211 acquires the Ack numbers corresponding to the i-th data packet and the j-th data packet. The server 211 multiplies the data amount of one data packet by the difference of the acquired Ack numbers (or the difference +1). As a result, the server 211 can calculate the total data amount from the i-th data packet to the j-th data packet.

FIG. 11 is a diagram of an example of a record table and calculation results according to the eighth embodiment. The Ack information recording unit 352 records a record table 1110 depicted in FIG. 11, for example. In the record table 1110, each response packet is correlated with an arrival time, an Ack number, and a TS (TSval) value. Although the arrival time is represented in seconds in the example depicted in FIG. 11, the arrival time is represented in an implementation-dependent manner and may be replaced with the internal clock of the server 211, for example.

Also in the example depicted in FIG. 11, the number of entries of the record table 1110 is 32 as is the case in the example depicted in FIG. 7; however, since the recording frequency of the entries are reduced as compared to the arrival frequency of the response packets, the response packets are culled and recorded, in the example of FIG. 11. For example, in the example depicted in FIG. 11, only one response packet is recorded per six response packets.

For ease of implementation, the number of entries of the record table 1110 may be a power of two. When all the entries of the record table 1110 are entered, the Ack information recording unit 352 overwrites older entries.

Calculation results 1120 depicted in FIG. 11 are calculation results of an arrival rate (bytes/second) based on the record table 1110 when the time span used for rate observation is four entries. Calculation results 1130 depicted in FIG. 11 are calculation results of an arrival rate (bytes/second) based on the record table 1110 when the time span used for rate observation is eight entries. The calculation results 1120, 1130 represent calculation results in the respective entries, and configuration may be such that all the calculation results 1120, 1130 corresponding to the entries are not retained.

Here, the calculation results 1120 are taken as an example to describe a calculation procedure of an arrival rate at the time of reception of the response packet of the entry #31. The server 211 calculates the difference in the TS value between the response packet of the entry #31 and the response packet of the entry #27 acquired by tracing back by four entries. In this case, the server 211 calculates TS(j)−TS(j−4)=TS(31)−TS(27)=39697−39685=12.

The server 211 calculates the difference in the Ack numbers between the response packet of the entry #31 and the response packet of the entry #27 acquired by tracing back by four entries. In this case, the serve 211 calculates Ack(j)−Ack(j−4)=Ack(31)—Ack(27)=2277729-2208225=69504.

The Ack number in the TCP is in bytes. Therefore, the total data amount of the corresponding data packets is 69504 bytes from the response packet of the entry #27 to the response packet of the entry #31.

It is assumed that the clock ratio between the server 211 and the client 221 is 1/500 based on the example depicted in FIG. 7, for example.

The server 211 multiplies the difference in the TS value by the clock ratio to calculate the elapsed time as 12/500=0.024000. The server 211 divides the total data amount by the elapsed time to calculate the arrival rate as 69504/0.024000=2896000≈29 [megabytes/second].

As described above, for the response messages from the client 221 for transmission data from the server 211 to the client 221, the server 211 according to the eighth embodiment stores Ack numbers (sequence numbers) corresponding to the acknowledged transmission data as well as the time stamps and the arrival times of the response messages.

The server 211 calculates information used for the calculation of the arrival rate based on the stored contents.

In the description of a ninth embodiment, portions different from the eighth embodiment will be described. The client 221 may not immediately return a response packet in response to the arrival of a transmission packet from the server due to a delayed response (delayed ack) consequent to a transfer control protocol and implementation thereof. The delayed response is specified in RFC1122, for example.

In the case of a delayed response, the response packet stores a time stamp later in time than the time stamp corresponding to the actual packet arrival time and the time stamp does not represent a correct arrival time difference.

In this regard, the server 211 according to the ninth embodiment determines whether a received response packet is transmitted according to the delayed response. The server 21 does not store to the record table 352a, the information of a response packet determined as being transmitted according to the delayed response. As a result, the server 211 can exclude the response packet determined as being transmitted according to the delayed response from the measurement so as to prevent the measurement of the arrival rate from being adversely affected by a time lag due to delayed transmission of the response packet.

For example, the server 211 can determine whether the response packet has been transmitted according to the delayed response by determining whether a response packet is a response to a single segment. Alternatively, if a value of TSecr has not changed even though the value of TSval has increased as compared to the previous response packet, the server 211 can determine that the response packet has been transmitted according to the delayed response.

As described above, the server 211 according to the ninth embodiment stores information of respective response messages exclusive of the response messages transmitted from the client 221 according to the delayed response among the response messages from the client 221. As a result, the server 211 can calculate the arrival rate, exclusive of the response messages transmitted according to the delayed response. Therefore, the accuracy can be improved in terms of calculation of the arrival rate based on time stamps (transmission time information) of response messages.

In the description of a tenth embodiment, portions different from the eighth embodiment will be described. When the packet rate is high and the arrival frequency of response packets is high, the processing load becomes high at the server 211. Additionally, for example, the record table 352a depicted in FIG. 10 increases in size in order to acquire a desired time difference.

In this regard, the server 211 according to the tenth embodiment culls the arriving response packets to be recorded in the record table 352a, according to the arrival frequency of the response packets. Since the arrival frequency of the response packets conforms to the sending rate of data packets, the server 211 determines the culling rate according to the sending rate, for example.

When the TCP is used as a transfer control protocol, the sending rate is not directly controlled and the number of transmission packets per RTT is controlled according to a congestion window (CWND) size. Therefore, when using the TCP or a similar protocol, the server 211 determines the culling rate of the response packets according to the congestion window size, which is a parameter for controlling the sending rate, for example.

For example, it is assumed that the number of entries of the record table 352a is 64. In this case, to retain the response packets for a period corresponding to the RTT with 64 entries, the server 21 may cull the response packets such that a response packet is recorded into an entry of the record table 352a once per the congestion window size/64 response packets.

As described above, for the response messages from the client 221, the server 211 according to the tenth embodiment culls the response messages to be recorded depending on information (e.g., the congestion window size) that indicates the transmission rate of data from the server 211 to the client 221, to record the sequence number, the transmission time information, and the arrival time. As a result, the processing load at the server 211 can be reduced. Additionally, the size of the record table 352a can be made smaller.

In the description of an eleventh embodiment, portions different from the eighth embodiment will be described. As described above, the number of transmission packets per RTT is limited by the congestion window size in the TCP. Therefore, if the response packets used for acquiring the difference have a time difference that is the same as the RTT, the sequence of the response packets becomes the same as the congestion window size and the measurement rate is dominated by the sending rate.

In particular, if the measurement time is set to a span almost the same as the RTT, the sending rate must attain a usable rate so as to acquire a burst size required for measurement of unavailable band, and such a situation eliminates the need for searching for vacant band.

Therefore, if this measurement method is used to know the level of the available band relative to the current sending rate, the server 211 makes the response packets sufficiently shorter than the number of packets that can be sent during the RTT period. The number of packets that can be sent during the RTT period generally corresponds to the congestion window size in the case of the TCP.

For example, if the response packets are culled and recorded as in the tenth embodiment, approximately 64 entries correspond to the RTT. Therefore, an entry difference used (difference between i and j) can be set to 8 entries or 16 entries.

As described above, the server 211 according to the eleventh embodiment selects a pair of the response messages to acquire the third information and the fourth information such that the data amount indicated by the third information is less than or equal to the data amount transmittable by the server 211 to the client 221 within the round trip time. As a result, even when the number of response packets per RTT is limited by the congestion window size, the arrival rate can be measured accurately.

In the description of a twelfth embodiment, portions different from the eleventh embodiment will be described. A shorter interval of a pair of the response packets used for calculation of the arrival rate creates a risk of measuring a rate higher than the actual available rate. If network variations, for example, RTT variations or variations in transmission delay described later are large, measurement is assumed to become more susceptible to the effects of other traffic and therefore, a stability-oriented measurement method is more practical.

In this regard, the server 211 according to the twelfth embodiment adjusts an interval of the response packets used for measuring the arrival rate according to the degree of network variation. For example, the server 211 makes the interval of the response packets used for measuring the arrival rate longer and shorter when the network variation is larger and smaller, respectively. As a result, control with a higher degree of safety can be provided in risky situations.

For example, a case of recording the culled response packets as in the tenth embodiment will be described. In this case, the server 211 adjusts the interval of the response packets to be evaluated such that, for example, the entry difference (difference between i and j) is set to 8 entries in the case of smaller network variations and to 16 entries in the case of larger network variations.

For example, if the entry difference (difference between i and j) is set to 4 entries, calculation results of the arrival rate (bytes/second) are as described for the calculation results 1120 depicted in FIG. 11. If the entry difference (difference between i and j) is set to 8 entries, calculation results of the arrival rate (bytes/second) are as described for the calculation results 1130 depicted in FIG. 11.

As indicated by the calculation results 1120, 1130, when an interval for acquiring the difference in the number of entries is doubled, the time difference between the response packets used to determine the difference is almost doubled so that the arrival rate is calculated using a longer time span. As a result, peaks are suppressed (up to 3021913) in the results in the case of the entry difference of 8 entries as compared to the case of the entry difference of 4 entries.

For example, if multiple flows of traffic are present in a mixed manner, burstiness of packet scheduling in a transmission queue on a path may cause a peak rate that is higher than the actual rate to appear due to temporarily permitted burstiness unless a longer measurement time is taken. Therefore, the arrival rate can be measured more accurately by evaluating traffic variations from variance of RTT observation values, etc. and changing the width of the number of traced-back entries according to the evaluation result.

As described above, the server 211 according to the twelfth embodiment selects a pair of the response messages used to acquire the third information and the fourth information such that the elapsed time indicated by the fourth embodiment varies according to the magnitude of network variations. As a result, the arrival rate can be measured accurately corresponding to the network variations.

In the description of a thirteenth embodiment, portions different from the eighth embodiment will be described. The server 211 according to the thirteenth embodiment uses calculation results of the arrival rate to control the sending rate in the TCP. As described above, the sending rate is generally controlled according to the value of the CWND in the TCP. For example, the server 211 controls the sending rate of the data packets such that the value of CWND/RTT approaches a peak value of the calculation results of the arrival rate.

As described above, when an interval of a pair of response packets used for calculation of the arrival rate is narrowed, a peak value of the arrival rate appears. Therefore, if the packets are sent in such a manner that generates burstiness of transmission (i.e., if the transmission pace of the packets is not intentionally made uniform at the time of transmission), a peak value of the measured rate is acquired when available band of a bottleneck link is fully used, and a lower value is acquired when available band is not fully used.

Therefore, by measuring the peak value of the arrival rate, available band can be estimated roughly. Thus, by controlling the sending rate by using an estimated value of the available band as a control target value of the sending rate, the sending rate control can be provided such that convergence to the available band quickly occurs.

As described above, the server 211 according to the thirteenth embodiment controls the sending rate of the data packets such that the peak value of the calculated arrival rate is an upper limit value of transmittable band. As a result, the data packets can be transmitted efficiently while suppressing congestion.

In the description of a fourteenth embodiment, portions different from the thirteenth embodiment will be described. Unless the measured peak value is discarded (aging) at some point, the value remains.

In this regard, the server 211 according to the fourteenth embodiment discards a peak value after a certain period has elapsed (aging of the peak value). For example, if the available rate for the TCP is measured, a peak value should basically be measurable at least once within the RTT. Therefore, for example, the server 211 retains a maximum value of the arrival rate for the previous one to two RTTs and controls the sending rate of the data packets such that the retained maximum value is used as the upper limit value of the transmittable band.

As described above, the server 211 according to the fourteenth embodiment controls the sending rate based on the peak value of the calculated arrival rates exclusive of the arrival rates before a predetermined period. As a result, the load of the server 211 can be reduced. Additionally, a reduction in transmission efficiency due to controlling the sending rate based on an old arrival rate can be avoided.

In the description of a fifteenth embodiment, portions different from the second embodiment will be described. The server 211 according to the fifteenth embodiment stores, for example, the record table 352a depicted in FIG. 10, including the item of transmission time.

FIG. 12 is a diagram of an example of transmission/reception of signals between a server and a client. The server 211 calculates $\Delta Tds(i,j)$, which is the difference between the transmission time of Data(i) corresponding to Ack(i) and the transmission time of Data(j) corresponding to Ack(j).

The server 211 calculates the difference of the calculated $\Delta Tds(i,j)$ and a value acquired by multiplying $\Delta Tar(i,j)$ by the calculated clock ratio, to measure variation in delay time of data packets from the server 211.

If $\Delta Tar(i,j)$ temporally increases relative to $\Delta Tds(i,j)$, it can be determined that the delay time of data packets from the server 211 is increasing. In contrast, if $\Delta Tar(i,j)$ temporally decreases relative to $\Delta Tds(i,j)$, it can be determined that the delay time of data packets from the server 211 is decreasing.

Since an increase in propagation delay in a packet network commonly occurs due to an increase in queue retention time, the variations in delay time measured in this way can be used as an index for congestion in the network. The server 211 controls the sending rate of the data packets based on a measurement result of delay time variations. For example, if the delay time is increasing, the server 211 prevents the sending rate of the data packets from increasing or reduces the sending rate. As a result, congestion in the network can be suppressed.

As described above, the server according to the fifteenth embodiment acquires a difference in transmission time at the server 211 between the first and last transmission data used for measurement. The server 211 acquires a value obtained by multiplying the difference between time stamps of response messages from the client 221 for the first and last transmission data used for measurement, by the calculated clock ratio (time conversion factor).

The server 211 measures variations in the delay time of the transmission data from the server 211 based on a difference of the acquired difference and a value. The server 211 controls the sending rate of the data packets based on the measurement result of the variations in delay time. As a result, the sending rate can be controlled according to the congestion in the network and the data packets can be transmitted efficiently while congestion is suppressed.

In the description of a sixteenth embodiment, portions different from the thirteenth embodiment or the fifteenth embodiment will be described. In the TCP, a vacant band search and congestion detection are performed. A method of the vacant band search may be a method of using a peak value as an available band estimation value for a control target of the sending rate as described in the thirteenth embodiment, for example. A method of the congestion detection may be a method of using variations (particularly, increasing tendency) in transmission direction delay described in the fifteenth embodiment. As a result, transfer control can be provided such that a vacancy of available band is quickly detected in a path to a communication counterpart in the network while suppressing congestion of the network.

It may be difficult to directly change the sending rate to a target rate in some cases depending on the method of sending rate control of the transfer control protocol. For example, although the sending rate is adjusted according to the value of the congestion window in the TCP as described above, if the value of the congestion window is abruptly increased, high burst traffic occurs and may cause congestion of the network. In this case, the sending rate or a parameter for controlling the sending rate has to be controlled such that the sending rate is set to the target rate.

In the case of providing the congestion control of the TCP as described in the thirteenth embodiment and detecting an increase in delay in the transmission direction with the configuration described in the fifteenth embodiment, if an increase in the delay is measured only once, even a mere fluctuation in packet arrival may cause a reaction. Therefore, for example, multiple measurement results are accumulated and when the cumulative total value thereof exceeds a threshold value, it is determined that congestion is present.

To deal with the congestion, for example, the server 211 adjusts the value of the congestion window. For example, the server 211 reduces the sending rate by half to adjust the value of congestion window. If the sending rate is reduced by half, for example, the server 211 controls the value of congestion window such that one packet can be sent when a returned data size reaches a size of two packets. However, the method of adjusting the value of the congestion window is not limited hereto and various methods can be used.

As described above, the server 211 according to the sixteenth embodiment reduces the sending rate of data packets when the delay time of the data packets is increasing. As a result, congestion in the network can be suppressed.

In the description of a seventeenth embodiment, portions different from the sixteenth embodiment will be described. In the case of providing control such that measured available band is used at once as described in the sixteenth embodiment, particularly when traffic sharing a bottleneck link suddenly increases in the network during a control delay thereof, an abrupt traffic increase may occur. Therefore, packets may be discarded due to buffer overflow.

In this regard, the server 211 according to the seventeenth embodiment may control the sending rate to a larger rate when the difference with the available band is large and control the sending rate to a smaller rate when the difference with the available band is small, such that the sending rate exponentially converges to the target rate.

A case of providing the congestion control through adjustment of a value of the congestion window will be described. In this case, the server 211 adjusts the value of the congestion window such that the value of the congestion window per RTT is doubled when the value of the congestion window considered as a target value is twice or more than the current value of the congestion window. The server 211 adjusts the value of the congestion window such that the difference from the target value of the congestion window per RTT is reduced by half when the value of the congestion window considered as the target value is less than twice of the current value of the congestion window.

Since burst traffic occurs if the value of the congestion window of the TCP is abruptly changed, the value of the congestion window may be increased such that the number of newly transmittable packets is approximately two to four per one response packet.

As described above, the server 211 according to the seventeenth embodiment changes a control amount of the sending rate according to the disparity (difference or ratio) between the target value of the sending rate based on the calculated arrival rate and the current sending rate. For example, the server 211 makes the control amount of the sending rate larger when the disparity is larger between the target value of the sending rate based on the calculated arrival rate and the current sending rate. As a result, an abrupt increase in traffic can be avoided.

In the description of an eighteenth embodiment, portions different from the sixteenth embodiment will be described. When congestion control of the TCP is provided as described in the sixteenth embodiment, the measured arrival rate of the client 221 at the time of detection of congestion is assumed as being reduced by the congestion. In this case, suitable available band is not indicated by a peak value of the arrival rate, and the latest available rate is considered as indicating the most realistic available band.

In this regard, the server 211 according to the eighteenth embodiment adjusts the value of the congestion window at the time of detection of congestion such that the sending rate approaches a measured value of the arrival rate. For example, if the sending rate is reduced by half, the server 211 controls the value of congestion window such that one packet can be sent when a returned data size reaches a size of two packets.

As described above, if the delay time of the data packets is increasing, the server 211 according to the eighteenth embodiment controls the sending rate of the data packets such that the sending rate approaches the calculated arrival rate. As a result, the data packet can be sent out according to the latest arrival rate that indicates the actual available band during congestion of the network. Therefore, the data packets can be transmitted efficiently while congestion is suppressed.

In the description of a nineteenth embodiment, portions different from the sixteenth embodiment will be described. For example, even when the server 211 has a control function as described in the sixteenth embodiment, an accurate arrival rate cannot be calculated unless the clock ratio of the client 221 is acquired.

In this regard, if the clock ratio of the client 221 cannot be acquired, the server 211 according to the nineteenth embodiment uses a conventional algorithm (e.g., reno or cubic) for the congestion control of the TCP.

As described above, if the clock ratio of the client 221 cannot be acquired, the server 211 according to the nineteenth embodiment controls the sending rate with an alternative means different from the control of the sending rate using the arrival rate based on the clock ratio. As a result, the sending rate can be controlled even if the clock ratio of the client 221 cannot be acquired.

In the description of a twentieth embodiment, portion different from the sixteenth embodiment will be described. For example, even when the server 211 has a control function as described in the sixteenth embodiment, an accurate arrival rate cannot be calculated unless the clock ratio of the client 221 is acquired.

In this regard, if the clock ratio of the client 221 cannot be acquired, the server 211 according to the twentieth embodiment controls the sending rate by using a data rate calculated from the data amount for an arrival time difference of the response packets.

As described above, if the clock ratio of the client 221 cannot be acquired, the server 211 according to the twentieth embodiment controls the sending rate with an alternative means different from the control of the sending rate using the arrival rate based on the clock ratio. As a result, the sending rate can be controlled even if the clock ratio of the client 221 cannot be acquired.

In the description of a twenty-first embodiment, portions different from the sixteenth embodiment will be described. For example, even when the server 211 has a control function as described in the sixteenth embodiment, a calculation result of the arrival rate is not acquired for a while after the start of communication.

In this regard, the server 211 according to the twenty-first embodiment uses a conventional algorithm (e.g., Slow Start, or reno or cubic) for the congestion control of the TCP until a predetermined period has elapsed from the start of communication.

As described above, the server 211 according to the twenty-first embodiment controls the sending rate by an alternative means different from the control of the sending rate using the arrival rate based on the clock ratio until a predetermined period has elapsed from the start of communication with the client 221. As a result, the sending rate can be controlled quickly after the start of communication.

In the description of a twenty-second embodiment, portions different from the sixteenth embodiment will be described. For example, even when the server 211 has a control function as described in the sixteenth embodiment, the number of effective digits cannot sufficiently be acquired for the divisor of calculation of the arrival rate unless a measurement value of the RTT is sufficiently large as compared to the time measurement resolution of the server 211.

The time stamp is an option in the TCP and therefore, may not be used in operation as a result of negotiation with the other party. Thus, if communication is started without using the time stamp in the first place, the arrival rate cannot be measured.

In this regard, the server 211 according to the twenty-second embodiment uses a conventional algorithm (e.g., reno or cubic) for the congestion control of the TCP in such a case.

As described above, if a measured value of the RTT is within a constant value, the server 211 according to the twenty-second embodiment controls the sending rate by an alternative means different from the control of the sending rate using the arrival rate based on the clock ratio. Alternatively, if the client 221 adds no time stamp, the server 211 according to the twenty-second embodiment controls the sending rate by an alternative means different from the control of the sending rate using the arrival rate based on the clock ratio. Alternatively, if the measurement value is not sufficiently large as compared to the resolution of the clock information of the server 211, the server 211 according to the twenty-second embodiment controls the sending rate with an alternative means different from the control of the sending rate using the arrival rate based on the clock ratio.

In the description of a twenty-third embodiment, portions different from the second embodiment will be described.

Figure 13A:
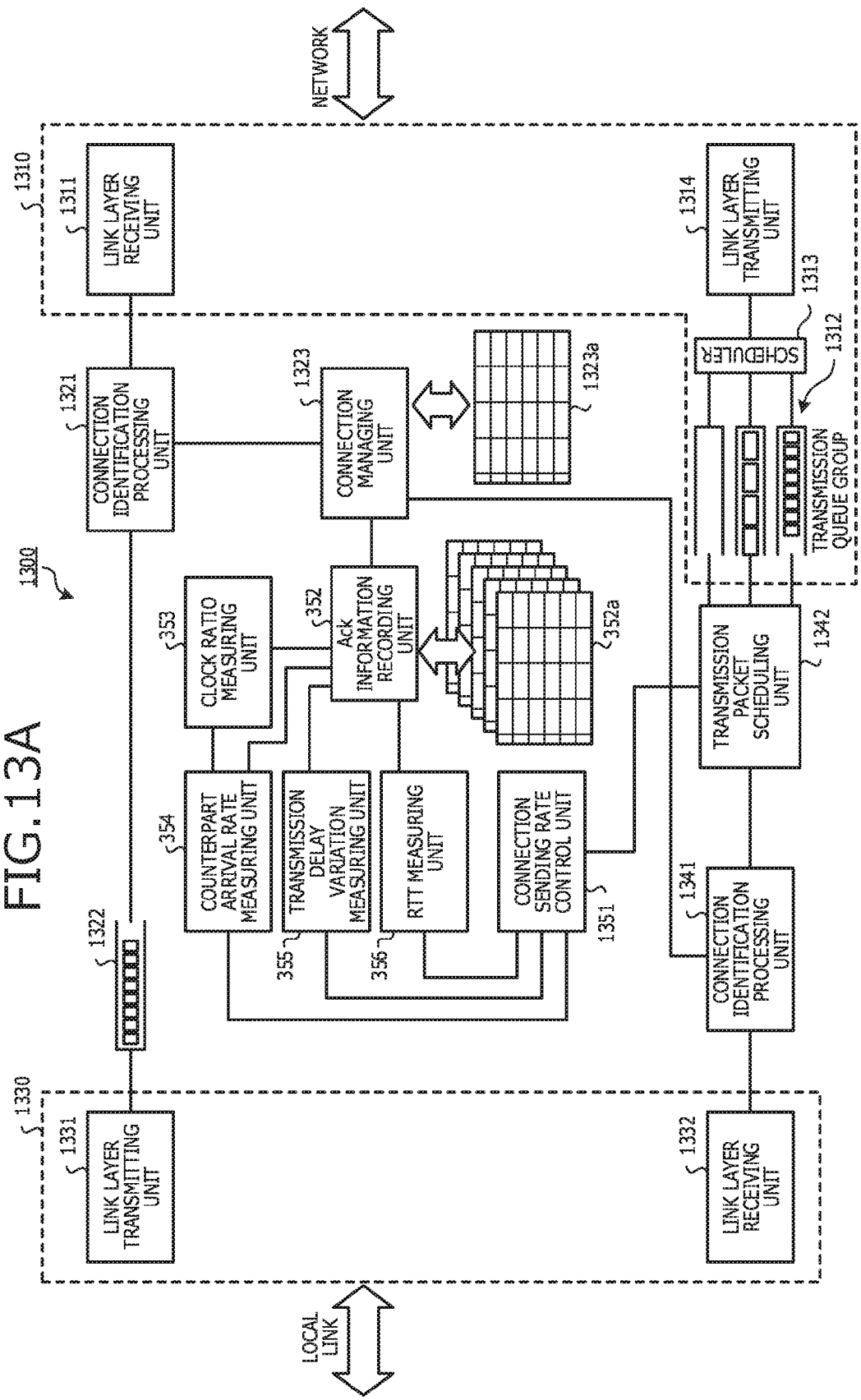
FIG. 13A is a diagram of an example of a relay apparatus according to a twenty-third embodiment.
Figure 13B:
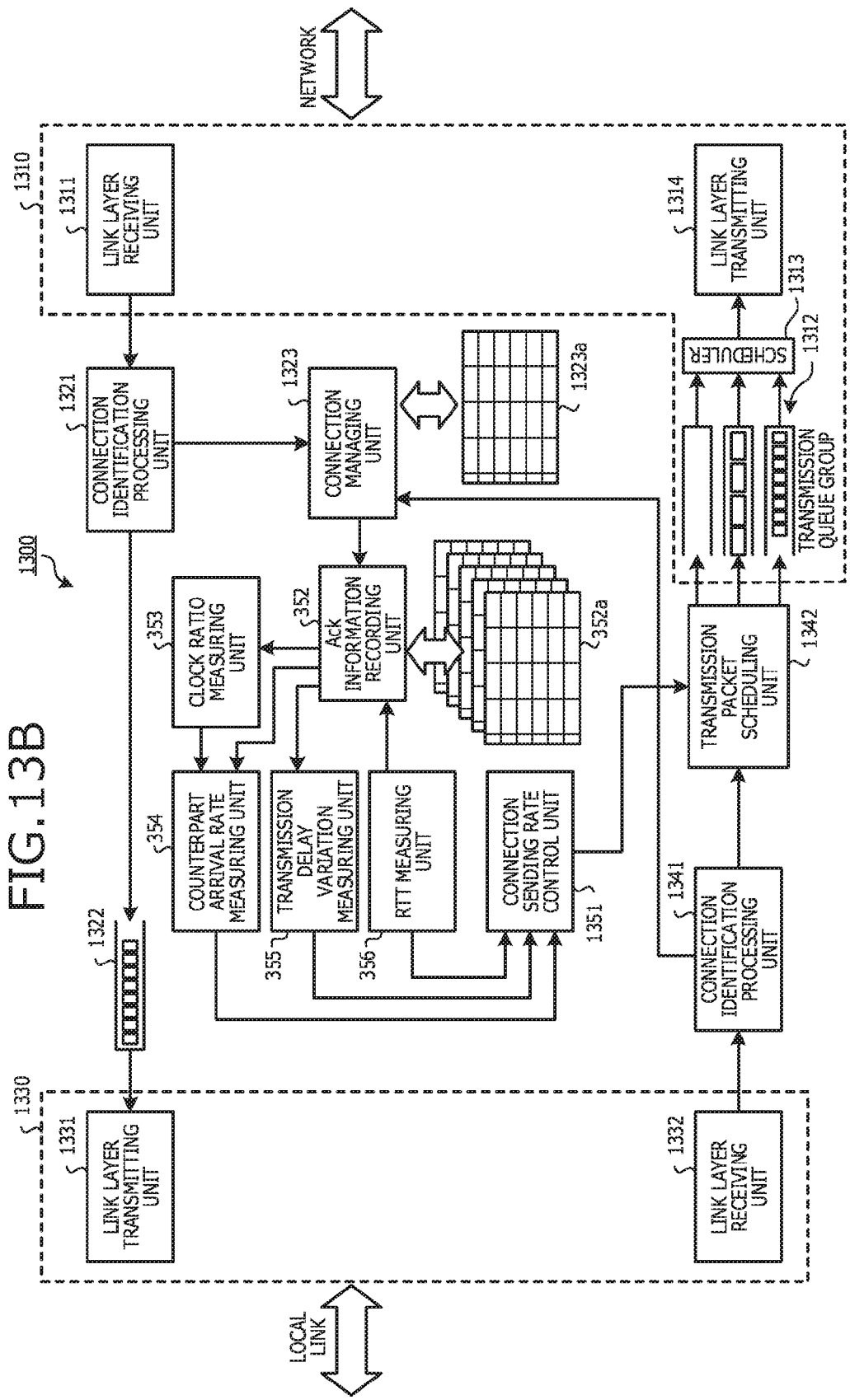
FIG. 13B is a diagram of an example of signal flow in the relay apparatus depicted in FIG. 13A.

FIG. 13A is a diagram of an example of the relay apparatus according to the twenty-third embodiment. FIG. 13B is a diagram of an example of signal flow in the relay apparatus depicted in FIG. 13A. In FIGS. 13A and 13B, portions identical to those depicted in FIGS. 3A and 3B are denoted by the same reference numerals used in FIGS. 3A and 3B and will not be described.

A relay apparatus 1300 depicted in FIGS. 13A and 13B is disposed on the internet 201 or the wireless access network 202 depicted in FIG. 2, for example, and is a relay apparatus that relays connections including communication between the server 211 and the client 221.

The relay apparatus 1300 includes link layer processing units 1310, 1330, a connection identification processing unit 1321, a transmission queue 1322, a connection managing unit 1323, a connection identification processing unit 1341, and a transmission packet scheduling unit 1342.

The relay apparatus 1300 includes the Ack information recording unit 352, the clock ratio measuring unit 353, the counterpart arrival rate measuring unit 354, the transmission delay variation measuring unit 355, the RTT measuring unit 356, and a connection sending rate control unit 1351.

The link layer processing unit 1310 includes a link layer receiving unit 1311, a transmission queue group 1312, a scheduler 1313, and a link layer transmitting unit 1314. The link layer receiving unit 1311 receives packets from the network (e.g., the server 211 of FIG. 2). The packets received by the link layer receiving unit 1311 include, for example, data packets from the server 211. The link layer receiving unit 1311 outputs the received packets to the connection identification processing unit 1321.

The transmission queue group 1312 includes respective transmission queues for the connections relayed by the relay apparatus 1300. The scheduler 1313 sequentially reads and outputs the packets stored in the transmission queue group 1312 to the link layer transmitting unit 1314 while performing scheduling between the connections. The link layer transmitting unit 1314 transmits to the network (e.g., the server 211 of FIG. 2), the packets output from the scheduler 1313.

The connection identification processing unit 1321 identifies the connections of the packets output from the link layer receiving unit 1311. The connection identification processing unit 1321 outputs the identification result to the connection managing unit 1323. The connection identification processing unit 1321 stores into the transmission queue 1322, the packets identified in terms of the connections.

The link layer processing unit 1330 includes a link layer transmitting unit 1331 and a link layer receiving unit 1332. The link layer transmitting unit 1331 sequentially reads and transmits to a local link (e.g., the client 221 of FIG. 2), packets stored in the transmission queue 1322.

The link layer receiving unit 1332 receives packets from the local link (e.g., the client 221 of FIG. 2). The packets received by the link layer receiving unit 1332 include, for example, response packets from the client 221 to the server 211. The link layer receiving unit 1332 outputs the received packets to the connection identification processing unit 1341.

The connection identification processing unit 1341 identifies the connections of the packets output from the link layer receiving unit 1332. The connection identification processing unit 1341 outputs the identification result to the connection managing unit 1323. The connection identification processing unit 1341 stores into the transmission packet scheduling unit 1342, the packets identified in terms of the connections.

The transmission packet scheduling unit 1342 schedules a packet output from the connection identification processing unit 1341 and a sending rate control packet and stores the packets into the transmission queue group 1312 based on the scheduling result.

The connection managing unit 1323 manages a connection management table 1323a (see, e.g., FIG. 14) that indicates the states, etc. of the connections based on the connection identification information output from the connection identification processing units 1321, 1341. Based on identification information of response packets, the connection managing unit 1323 outputs to the Ack information recording unit 352, information concerning response packets along with the identification.

The Ack information recording unit 352 records the record table 352a disposed for each of the connections based on the information output from the connection managing unit 1323. The clock ratio measuring unit 353 measures a clock ratio for each of the connections. The counterpart arrival rate measuring unit 354 measures the arrival rate for each of the connections. The transmission delay variation measuring unit 355 measures transmission delay variations for each of the connections. The RTT measuring unit 356 measures the RTT for each of the connections.

The connection sending rate control unit 1351 determines the sending rate of packets for each of the connections, based on the arrival rate output from the counterpart arrival rate measuring unit 354. The connection sending rate control unit 1351 outputs to the transmission packet scheduling unit 1342, a sending rate control packet that indicates the determined sending rate and is addressed to the transmitting side of the connection (e.g., the server 211). This enables the packet transmitting side to control the sending rate based on the measurement result of the arrival rate in the counterpart arrival rate measuring unit 354.

Although the arrival rate is measured to control the sending rate for each of the connections in this description, some of the connections relayed by the relay apparatus 1300 may be used for the measurement of the arrival rate and the control of the sending rate.

Although the sending rate on the transmitting side is controlled according to the measurement result of the arrival rate in this description, the measurement result of the arrival rate may be used as a parameter for monitoring the network state. The measurement result of the arrival rate may be used for Quality of Service (QoS) control inside the relay apparatus 1300. The measurement result of the arrival rate may be used for band control or packet scheduling that can be controlled by the relay apparatus 1300.

The relay apparatus 1300 depicted in FIGS. 13A and 13B can be implemented by the communications apparatus 380 depicted in FIG. 3C, for example. In this case, the link layer processing units 1310, 1330 depicted in FIGS. 13A and 13B can be implemented by the communication interface 384, for example. The connection identification processing unit 1321, the connection managing unit 1323, the connection identification processing unit 1341, and the transmission packet scheduling unit 1342 depicted in FIGS. 13A and 13B can be implemented by the CPU 381, for example.

The Ack information recording unit 352, the clock ratio measuring unit 353, the counterpart arrival rate measuring unit 354 depicted in FIGS. 13A and 13B can be implemented by the CPU 381, for example. The transmission delay variation measuring unit 355, the RTT measuring unit 356, and the connection sending rate control unit 1351 depicted in FIGS. 13A and 13B can be implemented by the CPU 381, for example.

The transmission queue 1322 depicted in FIGS. 13A and 13B can be implemented by the RAM 382, for example. The record table 352a and the connection management table 1323a depicted in FIGS. 13A and 13B are stored in the RAM 382, for example.

FIG. 14 is a diagram of an example of the connection management table. The connection managing unit 1323 manages, for example, the connection management table 1323a depicted in FIG. 14 based on the identification information of the connections output from the connection identification processing units 1321, 1341. Managing the connection management table 1323a as described above enables extraction of information of packets with respect to a connection that is used for measurement of the arrival rate among the connections relayed by the relay apparatus 1300. The generation and management of the connections can be achieved by using a technique such as connection tracking, for example.

As described above, according to the twenty-third embodiment, the arrival rate at the client 221 can be measured by the relay apparatus 1300 between the server 211 and the client 221 without adding a function to the client 221. A method of the measurement can be adjusted to acquire a measurement result suited to the form of use of the data rate to be measured.

This measurement result can be used for control of a sending rate of a protocol for data transfer so as to estimate available band to the client 221 or to detect vacancy of available band. Therefore, suitable adjustment can be made according to the sending rate and available band so as to achieve improved communication throughput and improved network utilization efficiency.

As described above, according to the measurement method, the communications apparatus, the relay apparatus, the measurement method, and the measurement program, improved measurement accuracy of the arrival rate can be achieved.

In the cases described in the second to twenty-third embodiments, the measurement apparatus 101 and the first communications apparatus 110 depicted in FIG. 1 are applied to the server 211, and the second communications apparatus 120 depicted in FIG. 1 is applied to the client 221. However, this is not a limitation of the form of application of the measurement apparatus 101, the first communications apparatus 110, and the second communications apparatus 120. For example, the measurement apparatus 101 and the first communications apparatus 110 depicted in FIG. 1 are applicable to the client 221, and the second communications apparatus 120 depicted in FIG. 1 is applicable to the server 211.

In recent networks, data below a network layer is packetized and delivered to a destination as a datagram, and end-to-end transfer guarantee is often implemented end-to-end by using a transport layer service such as the TCP higher than the network layer. An individual communication using the end-to-end transport layer service is referred to as a connection.

In such a network configuration, particularly when the network scale becomes large, it is difficult to strictly control individual traffic as a network, and the network is utilized as a best-effort type except in some specific applications.

Therefore, traffic is generated at such a level exceeding the capacity of the network and, if an excessive portion of the traffic cannot be absorbed by a queue etc., packets are discarded in the network. Even in the best-effort type, if individual connections allow data to flow disorderly, traffic exceeding the capacities of links is easily generated and results in a large amount of discarded packets, which may make effective communication impossible.

Excessive transmission not only causes buffer overflow in the network and reduces data transfer efficiency of the network, but also disturbs communication of other traffic. On the other hand, if transmission is too cautious, a surplus of the network capacity is generated, making the data transfer time correspondingly longer. This characteristic is generated not only in the Internet but also in a packet network having merging and branching when the best-effort communication is performed.

Available communication band varies due to another factor. Consequent to the development of techniques, various link layer techniques are provided in data communication and are used in a mixed manner and in multistage connection. If wireless communication is used in such a link, since control is generally provided to dynamically switch an optimum modulation mode depending on a radio wave condition, the available band may vary even when no other traffic flows.

Therefore, a network for best-effort communication requires congestion control of searching for an available throughput changing due to a degree of congestion of the network and variations in a link capacity and adjusting the sending rate to the other party while avoiding abrupt traffic variations. However, since the available communication band constantly varies, the available communication band has to be quickly known so as to constantly acquire a favorable throughput.

The TCP is widely used as a protocol implementing the transport layer service and has a congestion control algorithm called tahoe and improved versions thereof called reno/new reno implemented as a congestion control algorithm for avoiding congestion.

However, these algorithms simply increase the number of transmission packets one by one per RTT until a discarded packet is detected, and reduce the number of transmission packets per RTT by half or to a minimum value when a discarded packet is detected. Therefore, if the RTT is large, throughput is not easily increased and an effective communication speed may not be achieved.

Therefore, proposals have been made to actively increase the packet transmission amount when a discarded packet is not detected and further to detect network congestion by using a change in RTT. However, a method such as using detection of discarded packets for throughput suppression constantly generates discarded packets and therefore, may reduce network efficiency or may steadily cause buffer retention.

In a method of detecting congestion from an increase in delay, although it can be known that available band has been exceeded, the level of vacancy cannot be known when surplus available band exists and therefore, in the end, a technique must be used such that throughput is slowly increased so as not to generate congestion.

Although such control limitations are considered to be improved by actively knowing the available band, this measurement is not easy. A well-known method is to measure the reception rate so as to know available band because the band arriving at the receiving side is speed controlled at a narrowest link (bottleneck link) on the way when the transmitting side performs excessive transmission.

However, since the reception rate can be measured directly only on the receiving side, the reception rate must be measured on the receiving side and transmitted to the transmitting side so as to implement this method. Particularly in a situation in which a widely used protocol like the TCP already exists, it is difficult to spread a method that does not work unless a function is implemented on both the transmission and receiving sides. The existing congesting control algorithms of the TCP are applied only to the transmitting side and therefore, the effect thereof is easily acquired in this situation.

On the other hand, a method of measuring the arrival rate at the other party from progress in Ack number reported by Ack packets is known as control that can be provided by operations on the transmitting side only. If the receiving side quickly returns the response packets after reception of data, a response packet interval indicates an arrival interval of the data packets.

However, this measurement method is susceptible to the effect of queue delays in the path through which the Ack packets are returned. Under ideal conditions such as the absence of other packets flowing over the network, the Ack packets having a short length are thus, quickly sent back and returned to a data transmission source substantially with a propagation delay. However, in reality, the arrival time easily varies due to the effect of other traffic. For example, if only a long packet of other traffic is present in the direction of the return path, a queueing delay of a level that cannot be ignored occurs.

In the case of a small queue delay on the order of one packet, variations can be suppressed by measuring the data arrival rate based on multiple Ack packets. However, in a situation in which congestion is caused by the return path itself such that delay gradually increases, the arrival intervals of the Ack packets are continuously widened relative to the data arrival intervals and the reverse situation may also occur. Therefore, it is difficult to accurately measure the arrival rate in such a situation.

In this regard, the embodiments described above can measure the arrival rate based on information easily acquirable on the transmitting side by using the transmission time information and the arrival times of the response messages. Therefore, the arrival rate can be measured without adding a function to the receiving side. Additionally, the embodiments can suppress the effect of queue delay of the Ack packets on the measurement result of the arrival rate.

Moreover, by calculating and using a time ratio (time conversion factor) between the transmitting side and the receiving side, the arrival rate can be measured accurately even when the time bases of the transmitting side and the receiving side do not match each other.

The measurement method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

An aspect of the present invention provides an effect that enables measurement of an arrival rate unaffected by a return path to be implemented solely from information acquired based on a data transfer procedure on the transmitting side.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A measurement apparatus comprising:
a first communications apparatus configured to send transmission data to a second communications apparatus and to receive from the second communications apparatus a plurality of response messages, each responding to a corresponding received transmission data;
a calculating circuit configured to calculate a value by multiplying a time conversion factor between the first communications apparatus and the second communications apparatus with a transmission data arrival rate based on calculated third and acquired fourth information for transmission data arrivals at the second communications apparatus, the time conversion factor being based on first information and second information, wherein:
the first information indicates a difference between transmission time information appended by the second communications apparatus to two response messages, among the plurality of response messages, responding to two received transmission data transmitted from the first communications apparatus to the second communications apparatus,
the second information indicates a difference in arrival time of the two response messages at the first communications apparatus,
the calculated third information indicates a total transmission data amount arriving at the second communication apparatus between two arbitrary response messages that are the same or different from the two response messages used for acquiring the first information and the second information, and
the acquired fourth information indicates a difference between transmission time information appended by the second communications apparatus to the two arbitrary response messages used for calculating the third information, wherein
the calculating circuit is configured to control a transmission rate of subsequent data transmitted from the first communications apparatus to the second communications apparatus based on the calculated value; and
the first communication apparatus is configured to send the subsequent data based on the transmission rate.

2. The measurement apparatus according to claim 1, wherein
the calculating circuit, in calculating the time conversion factor, acquires and averages the first information and the second information corresponding to pairs of the response messages.

3. The measurement apparatus according to claim 1, wherein
the two response messages used for acquiring the first information and the second information have a time interval longer than an interval of response messages used for acquiring the third information and the fourth information.

4. The measurement apparatus according to claim 1, wherein
the calculating circuit identifies a time conversion factor closest to a ratio between the first information and the second information, among a plurality of candidates of the time conversion factor and multiplies the identified time conversion factor by the rate that is based on the third information and the fourth information so as to calculate the arrival rate.

5. The measurement apparatus according to claim 1, wherein
the calculating circuit calculates the arrival rate for a plurality of different periods by using the one calculated time conversion factor.

6. The measurement apparatus according to claim 1, wherein
the calculating circuit continuously calculates the time conversion factor during communication between the first communications apparatus and the second communications apparatus.

7. The measurement apparatus according to claim 1, comprising
a storage storing therein a sequence number corresponding to transmission data that is transmitted from the first communications apparatus to the second communications apparatus and acknowledged by a response message from the second communications apparatus, the storage further storing therein the transmission time information and the arrival time at the first communications apparatus of the response message, wherein
the calculating circuit calculates the first information, the second information, the third information, and the fourth information based on contents stored by the storage.

8. The measurement apparatus according to claim 7, wherein
the storage stores the sequence number, the transmission time information, and the arrival time at the first communications apparatus for each response message from the second communications apparatus excluding a response message transmitted from the second apparatus as a delayed response.

9. The measurement apparatus according to claim 7, wherein,
the storage stores the sequence number, the transmission time information, and the arrival time at the first communications apparatus for a response message that recorded and obtained by culling response messages from the second communications apparatus according to information that indicates a rate of data transmission from the first communications apparatus to the second communications apparatus.

10. The measurement apparatus according to claim 1, wherein,
a pair of response messages used for acquiring the third information and the fourth information is selected such that a data amount indicated by the third information is less than or equal to a data amount transmittable by the first communications apparatus to the second communications apparatus within a round trip time.

11. The measurement apparatus according to claim 1, wherein
a pair of the response messages used for acquiring the third information and the fourth information is selected such that an elapsed period indicated by the fourth information varies corresponding to a magnitude of network variation.

12. A communications apparatus comprising:
a calculating circuit configured to calculate an arrival rate for arrival at a counterpart communications apparatus by multiplying a time conversion factor between the communications apparatus and the counterpart communications apparatus, with a transmission data arrival rate based on calculated third information and acquired fourth information, the time conversion factor being based on first information and second information, wherein:

the first information indicates a difference between transmission time information appended by the counterpart communications apparatus to two response messages responding to two received transmission data transmitted from the communications apparatus to the counterpart communications apparatus, the second information indicates a difference in arrival time of the two response messages at the communications apparatus, the calculated third information indicates a total transmission data amount from the communications apparatus and arriving at the counterpart communications apparatus between two arbitrary response messages that are the same as or different from the two response messages used for acquiring the first information and the second information, and the acquired fourth information indicates a difference between transmission time information appended by the counterpart communications apparatus to the two arbitrary response messages used for calculating the third information; and a control circuit that based on the transmission data arrival rate calculated by the calculating circuit, which controls a sending rate of the transmission data transmitted between the communications apparatus and the counterpart communications apparatus based on the calculated value, and the communication apparatus is configured to send subsequent data based on the sending rate.

13. The communications apparatus according to claim 12, wherein the control circuit refrains from controlling the sending rate based on the arrival rate, when a ratio between the first information and the second information is not within a plurality of ranges of the time conversion factor.

14. The communications apparatus according to claim 12, wherein, the control circuit calculates the time conversion factor for pairs of the two response messages, and the control circuit refrains from controlling the sending rate based on the arrival rate, when variation of the calculated time conversion factor is at least a predetermined magnitude.

15. The communications apparatus according to claim 12, wherein the control circuit controls the sending rate such that a peak value of the arrival rate calculated by the calculating circuit is an upper limit value of a transmittable band.

16. The communications apparatus according to claim 15, wherein the control circuit controls the sending rate based on the peak value of arrival rates calculated by the calculating circuit, excluding an arrival rate before a predetermined period.

17. The communications apparatus according to claim 12, wherein the control circuit measures variation in a delay time of transmission signals from the communications apparatus based on a difference between a transmission time of transmission data that is transmitted by the communications apparatus and respectively corresponds to two arbitrary response messages transmitted by the counterpart communications apparatus in response to receiving the transmission data, and a value obtained by multiplying a difference in the transmission time information of the two response messages by the time conversion factor, and the control circuit controls the sending rate based on a measurement result of the variation in the delay time.

18. The communications apparatus according to claim 17, wherein, the control circuit reduces the sending rate when the delay time is increasing based on the measurement result of the variation in the delay time.

19. The communications apparatus according to claim 12, wherein the control circuit changes a control amount of the sending rate according to disparity between a target value of the sending rate based on the arrival rate and a current sending rate.

20. A relay apparatus comprising:

a first communications apparatus configured to send transmission data to a second communications apparatus and to receive from the second communications apparatus a plurality of response messages, each responding to a corresponding received transmission data;

a calculating circuit configured to calculate a value by multiplying a time conversion factor between the first communications apparatus and the second communications apparatus, with a transmission data arrival rate based on calculated third information and acquired fourth information for transmission data arrivals at the second communications apparatus, the time conversion factor being based on first information and second information, wherein:

the first information indicates a difference between transmission time information appended by the second communications apparatus to two response messages responding to two received transmission data transmitted from the first communications apparatus to the second communications apparatus, the second information indicates a difference in arrival time of the two response messages at the relay apparatus, the calculated third information indicates a total transmission data amount arriving at the second communications apparatus between two arbitrary response messages that are the same as or different from the two response messages used for acquiring the first information and the second information, and the acquired fourth information indicates a difference between transmission time information appended by the second communications apparatus to the two arbitrary response messages used for calculating the third information, wherein the relay apparatus relays communication between the first communications apparatus and the second communications apparatus, the communication between the first communications apparatus and the second communications apparatus being relayed at a transmission rate that is controlled based on the calculated value, and the first communications apparatus is configured to send subsequent data based on the transmission rate.

* * * * *